(12) United States Patent
Gannon et al.

(10) Patent No.: US 8,972,540 B2
(45) Date of Patent: *Mar. 3, 2015

(54) INCENTING DIVULGENCE OF INFORMATION FOR BINDING IDENTIFIERS ACROSS INFORMATION DOMAINS WHILE MAINTAINING CONFIDENTIALITY

(75) Inventors: Mark A. Gannon, Sleepy Hollow, IL (US); Joshua B. Hurwitz, Niles, IL (US); John Richard Kane, Fox River Grove, IL (US); David W. Kravitz, Fairfax, VA (US)

(73) Assignee: Motorola Solutions, Inc., Schaumburg, IL (US)

( * ) Notice: Subject to any disclaimer, the term of this patent is extended or adjusted under 35 U.S.C. 154(b) by 59 days.

This patent is subject to a terminal disclaimer.

(21) Appl. No.: 12/649,703

(22) Filed: Dec. 30, 2009

(65) Prior Publication Data

US 2011/0161471 A1      Jun. 30, 2011

(51) Int. Cl.
*G06F 15/177*     (2006.01)
*G06Q 30/02*      (2012.01)
(Continued)

(52) U.S. Cl.
CPC ............ *G06Q 30/02* (2013.01); *H04N 21/4784* (2013.01); *H04N 21/812* (2013.01)
USPC ........... 709/221; 709/204; 709/224; 709/229; 705/7; 705/14

(58) Field of Classification Search
CPC .................................................. H04N 21/4784
USPC .......................... 709/204, 224, 229; 705/7, 14
See application file for complete search history.

(56) References Cited

U.S. PATENT DOCUMENTS 6,343,274 B1    1/2002   McCollom et al.
6,850,901 B1    2/2005   Hunter et al.
(Continued)

FOREIGN PATENT DOCUMENTS

WO    2007075685 A2    7/2007
WO    2009117733 A2    9/2009

OTHER PUBLICATIONS

Leenes et al., "Prime White Paper," EU Project Prime, Privacy and Identity Management for Europe, Third and Final Version May 15, 2008, 22 pages.—Downloaded from https://www.prime-project.eu/prime_products/whitepaper/PRIME-Whitepaper-V3.pdf on Dec. 30, 2009.

(Continued)

*Primary Examiner* — Glenford Madamba
(74) *Attorney, Agent, or Firm* — Barbara R. Doutre

(57) ABSTRACT

Disclosed are methods for extracting and using information about an entity that has a presence in a number of information domains. The entity has separate identifiers in each of several domains. Various techniques are described that bind together the identifiers of the entity across the domains. The results of the binding are provided to an interested party that can review information extracted about the entity's behavior in the multiple domains. The interested party is not given access to information that would compromise the confidentiality of the entity. A trusted broker has access to information about the behavior of the entity in the several domains. The broker analyzes that information and provides the analysis to the interested party, again without compromising the confidentiality of the entity. An "incentivizer" works with the broker to extract from the domains information that would be useful in binding together the different identifiers of the entity.

24 Claims, 21 Drawing Sheets

(51) Int. Cl.
    *H04N 21/4784*    (2011.01)
    *H04N 21/81*      (2011.01)

(56) References Cited

U.S. PATENT DOCUMENTS

| | | | |
|---|---|---|---|
| 6,920,448 B2 | 7/2005 | Kincaid et al. | |
| 7,406,453 B2 | 7/2008 | Mundie et al. | |
| 7,606,897 B2 * | 10/2009 | Izrailevsky et al. | 709/224 |
| 7,735,117 B2 | 6/2010 | Nadalin et al. | |
| 2004/0002878 A1 | 1/2004 | Hinton | |
| 2005/0192863 A1 | 9/2005 | Mohan | |
| 2005/0204041 A1 | 9/2005 | Blinn et al. | |
| 2005/0246391 A1 | 11/2005 | Gross | |
| 2006/0020508 A1 | 1/2006 | Gorti et al. | |
| 2006/0265495 A1 * | 11/2006 | Butler et al. | 709/224 |
| 2007/0299735 A1 | 12/2007 | Mangalick et al. | |
| 2008/0065490 A1 | 3/2008 | Novick et al. | |
| 2008/0103888 A1 | 5/2008 | Weir | |
| 2008/0103971 A1 * | 5/2008 | Lukose et al. | 705/40 |
| 2008/0313035 A1 * | 12/2008 | Peeters et al. | 705/14 |
| 2008/0319846 A1 | 12/2008 | Leming et al. | |
| 2009/0037270 A1 | 2/2009 | Patro | |
| 2009/0069911 A1 * | 3/2009 | Stefik | 700/94 |
| 2009/0182589 A1 | 7/2009 | Kendall et al. | |
| 2009/0276305 A1 | 11/2009 | Clopp | |
| 2009/0293018 A1 | 11/2009 | Wilson et al. | |
| 2010/0042735 A1 * | 2/2010 | Blinn et al. | 709/229 |
| 2010/0192197 A1 | 7/2010 | Nadalin et al. | |
| 2010/0198911 A1 | 8/2010 | Zhang et al. | |
| 2011/0161147 A1 | 6/2011 | Gannon et al. | |
| 2011/0161472 A1 | 6/2011 | Gannon et al. | |
| 2011/0161473 A1 | 6/2011 | Gannon et al. | |
| 2011/0161474 A1 | 6/2011 | Gannon et al. | |

OTHER PUBLICATIONS

Watson et al., "Liberty ID-FF Architecture Overview," Liberty Alliance Project, Version 1.2, Errata- v1.0, 2004-2005, 44 pages.
International Search Report for International Patent Application No. PCT/US20101058628 mailed on Dec. 7, 2011.
Non Final Office Action mailed on Feb. 4, 2011 in U.S. Appl. No. 12/649,728, Mark A. Gannon, filed Dec. 30, 2009.
Final Office Action mailed on Jul. 19, 2011 in U.S. Appl. No. 12/649,728, Mark A. Gannon, filed Dec. 30, 2009.
Final Office Action mailed on Aug. 19, 2011 in U.S. Appl. No. 12/649,776, Mark A. Gannon, filed Dec. 30, 2009.
Non Final Office Action mailed on Mar. 7, 2011 in U.S. Appl. No. 12/649,776, Mark A. Gannon, filed Dec. 30, 2009.
Non Final Office Action mailed on Apr. 14, 2011 in U.S. Appl. No. 12/649,795, Mark A. Gannon, filed Dec. 30, 2009.
Non Final Office Action mailed on Apr. 5, 2012 in U.S. Appl. No. 12/649,748, Mark A. Gannon, filed Dec. 30, 2009.
Non Final Office Action mailed on Jan. 30, 2012 in U.S. Appl. No. 12/649,776, Mark A. Gannon, filed Dec. 30, 2009.
Final Office Action mailed on Dec. 27, 2011 in U.S. Appl. No. 12/649,795, Mark A. Gannon, filed Dec. 30, 2009.
Non Final Office Action mailed on Dec. 6, 2012 in related U.S. Appl. No. 12/649,728, filed Dec. 30, 2009.
European Extended Searc Report mailed on Dec. 17, 2013 for European Application No. 10795504.9 filed Dec. 2, 2010.
Final Office Action mailed on Aug. 7, 2012 in U.S. Appl. No. 12/649,748, Mark A. Gannon, filed Dec. 30, 2009.
Non Final Office Action mailed on Dec. 6, 2013 in U.S. Appl. No. 12/649,748, Mark A. Gannon, filed Dec. 30, 2009.
Final Office Action mailed on Jul. 3, 2013 in U.S. Appl. No. 12/649,728, Mark A. Gannon, filed Dec. 30, 2009.
Final Office Action mailed on Jul. 24, 2012 in U.S. Appl. No. 12/649,776, Mark A. Gannon, filed Dec. 30, 2009.
Non Final Office Action mailed on Jan. 28, 2014 in U.S. Appl. No. 12/649,795, Mark A. Gannon, filed Dec. 30, 2009.

* cited by examiner

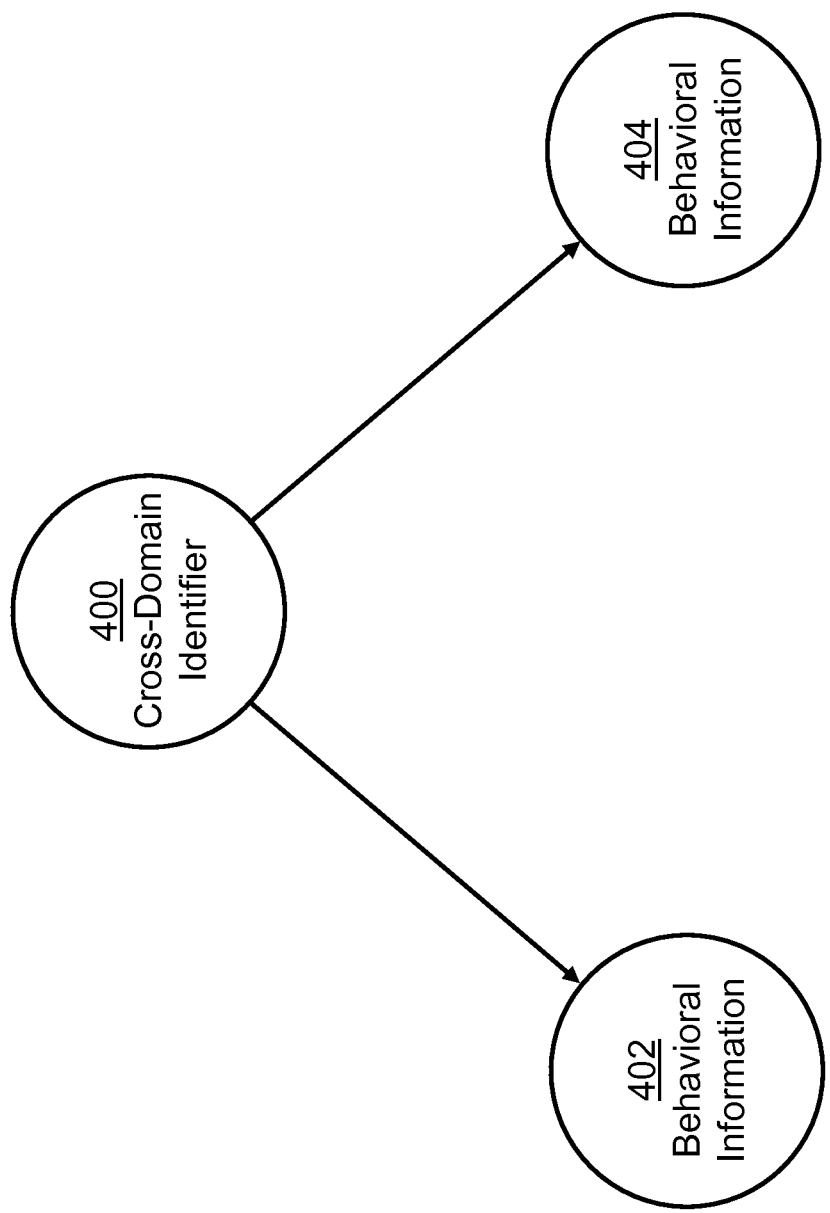

| 808 | Receive, from the operator, information about a redemption of the coupon, the redemption in association with the second identifier of the entity in the second domain. |

| 908 | Optionally and based, at least in part, on the received information, send a reward associated with the first identifier. |

INCENTING DIVULGENCE OF INFORMATION FOR BINDING IDENTIFIERS ACROSS INFORMATION DOMAINS WHILE MAINTAINING CONFIDENTIALITY

CROSS-REFERENCE TO RELATED APPLICATIONS

The present application is related to four other applications, filed on an even date therewith and assigned to the same assignee. These four other applications are Ser. Nos. 12/649,728, 12/649,748, 12/649,776, and Ser. No. 12/649,795, and they are included herein by reference in their entireties.

FIELD OF THE INVENTION

The present invention is related generally to data analytics and, more particularly, to correlating information across multiple information domains.

BACKGROUND OF THE INVENTION

An unexpected consequence of the proliferation of subscription services, retail "loyalty" clubs, on-line social networks, etc., is the fragmentation of consumer data. An "entity" (for example, a human being) may have a presence in several of these information domains: He subscribes to a cable-television service, uses a customer loyalty card when shopping in a local grocery store, and logs onto a number of on-line social networks. The behavior of the person in each information domain generates potentially useful information that can be collected by the owner of the domain. For example, the cable-television provider knows what shows and advertisements he watches, while the owner of the grocery store tracks purchases made using the loyalty card. This information can be very useful to the domain owners in helping them to know what their customers prefer.

While observations of behavior within one information domain can be valuable to the owner of that domain, potentially valuable observations of "cross-domain" behavior may be very difficult to obtain. For example, the person watches an advertisement for a soft drink on cable television and then runs out to purchase the soft drink at his preferred grocery store. The cable-television provider knows that he watched the ad, while the grocery store owner knows he bought the soft drink. However, it is very difficult to conclude that watching the ad led to (or, at the very least, shortly preceded in time) the purchase because that behavior does not occur within any one information domain. Instead, that behavior crosses the two domains of cable-television viewing and grocery shopping.

The manufacturer of the soft drink is, of course, very interested in measuring the effectiveness of the advertising campaign he is running on the cable-television service. In this example, all of the information useful to the soft-drink manufacturer has been gathered by the separate domain owners: The ad-viewing behavior is recorded in association with the person's presence in the first domain (the cable-television service), while the soft-drink purchase behavior is recorded in association with the person's presence in the second domain (the grocery store). However, there is nothing to connect the viewing of the ad with the subsequent purchase of the soft drink.

This person probably has a separate "identifier" associated with his presence in each information domain, that is, he has a subscription account identifier with the cable-television provider, a loyalty card number at the grocery store, and one or more log-in account names for the social networks he visits. The problem of cross-domain information correlation can be restated as saying that it is very difficult to bind together these multiple identifiers to say that they all refer to the same person. If a cross-domain binding of the identifiers could be made, then behavior associated with the user's multiple identifiers could also be correlated. In this particular example, the ad viewing could be correlated with the soft-drink purchase. While that alone does not prove a cause and effect, the correlated information is of great interest to the soft-drink manufacturer. If such information were available for a large number of customers, then the manufacturer could draw reasonable conclusions about the effectiveness of his advertising campaign.

Useful as correlating these identifiers across information domains may be to the soft-drink manufacturer, customers may perceive here a violation of privacy. Such perceptions are likely to lower customer acceptance of cross-domain identifier binding. In a general sense, such correlations may begin to interfere with the customer's privacy. The example given above may be innocuous, and the customer might not fret if the soft-drink manufacturer concludes that a purchase was motivated by viewing an advertisement. However, other examples may be easily considered that would make the customer suspicious of an invasion of privacy. Indeed, people are already concerned if, after searching the web for information on leaf blowers, they start seeing ads for leaf blowers appear on the web pages they visit.

Preserving customer confidentiality across information domains is also important to the domain owners. Each domain owner is reluctant to share, without compensation, the potentially valuable information gathered about behavior within his domain. Also, the owner does not wish to jeopardize the gathering of future information or even lose the customer's business if the customer feels that his confidentiality is being compromised.

BRIEF SUMMARY

The above considerations, and others, are addressed by the present invention, which can be understood by referring to the specification, drawings, and claims. According to aspects of the present invention, an incentivizer incents desired behavior by an entity. The incenting is usually done through a broker: The incentivizer sends rules specifying how it wants to incent specific behavior to the broker, and the broker implements the rules or sends them to an operator in the domain to implement. If the incenting proves successful (that is, if the entity performs a transaction in the desired manner), then the results of the transaction are sent back to the incentivizer. The incentivizer then rewards at least one operator in at least one domain. (The incented transaction may occur entirely within a single domain or may cross domains).

One major use of the incentivizer is to incent behavior that causes an entity to reveal, by means of an incented cross-domain transaction, enough information so that a binder can bind together the entity's identifiers across multiple domains.

The incentivizer may be a neutral party working to help the binder get its information. In other embodiments, the incentivizer represents the interests of a commercial (or other) organization, providing, for example, advertisements and coupons for products or services. These non-neutral incentivizers generally work through the broker to prevent them from having access to confidential information of the entities. In these cases, the results given to the incentivizer may include only statistical information gathered over a population of entities without revealing any details about any one transaction or about any one entity.

In some embodiments, the incentivizer attempts to gather marketing information, such as business statistics relevant to a given business area. The incentivizer incents business entities to give up their own business information in return for statistical information about a group of businesses operating in this particular business area.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIG. 4 is a data-structure diagram of an exemplary cross-domain identifier;

DETAILED DESCRIPTION

Figure 1:
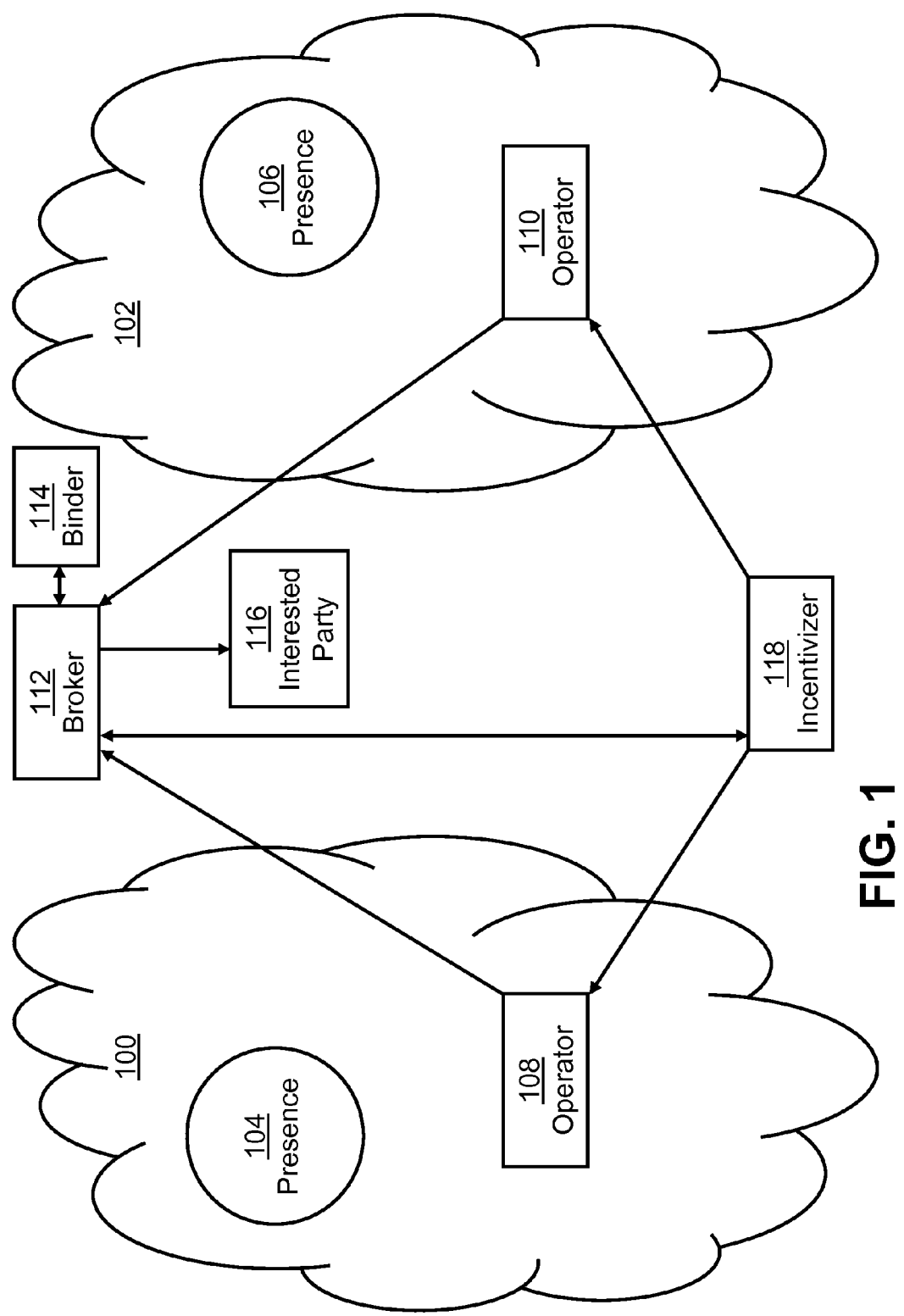
FIG. 1 is an overview of a representational environment in which the present invention may be practiced.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

FIG. 1 portrays a representative environment in which aspects of the present invention may be practiced. As a conceptual aid, the environment of FIG. 1 may be divided into three logical portions: First, the information domains 100 and 102 in which an entity exhibits some kind of observable behavior. Second, the three applications called the broker 112, the binder 114, and the incentivizer 118 extract useful information from the entity's observed behavior and package that useful information for another's use. The third logical portion is the interested party 116 that uses the packaged information.

Beginning the detailed description with the first logical portion mentioned above, it should first be noted that the entity itself is not shown in FIG. 1. For ease of the present discussion, the entity is usually taken to be a human being, but other entities are possible such as a business, social group, government entity, or other organization. It is the entity's behavior in the information domains 100, 102 that is most important for the present discussion.

These information domains 100, 102 may be of many different types (and may number more than two). Two information domains used in several examples of the present discussion are a media-providing domain 100 and a retail domain 102. In the first, media are provided to the entity, and the entity is a consumer of the media. Standard examples of media-providing domains 100 include a cable-television service, music and video services, telecommunications services including telephone services, Internet-based services, and social networks. A familiar retail domain 102 is a grocery store. A web site can be both a media-providing domain 100 and a retail domain 102. Other types of information domains 100, 102 include public-safety jurisdictions and domains set up specifically for the members of an organization.

The entity exhibits behavior in the information domains 100, 102, and that behavior is, at least to some extent, observed and recorded. For a cable-television domain 100, the entity's behavior includes what shows and advertisements he watches. Observable behavior in a retail domain 102 includes purchases made, products scanned even if not purchased, and interactions with "smart" signs and advertisements. Behavior in a public-safety domain includes arrests by the police, warnings given, and fines or other penalties assessed. The observable behavior of other domains 100, 102 can be easily imagined.

Observable behavior in the information domain 100 is associated with a "presence" 104 of the entity. This presence 104 is simply an identifier of the entity particular to this information domain 100. If the information domain 100 provides media, then the entity's presence 104 may be identified by the entity's subscription account number. In some media-providing domains (e.g., Internet-based providers), the presence identifier 104 may be a hardware or software token (e.g., a "cookie"). The presence 106 of the entity in a retail domain 102 can be a "loyalty card" number assigned to the entity. In a banking domain, the entity's presence can be identified by a checking account number. In an on-line social network, the entity can identify his presence by a log-in name or avatar. In general, the entity may have a different presence identifier 104, 106 in each of the information domains 100, 102 in which he exhibits behavior. The proliferation of these presence identifiers 104, 106 is one of the key elements driving some aspects of the present invention.

It may be useful to emphasize that the observed behavior of the entity within a particular information domain 100 is tied to the entity's identifier 104 in that domain 100, and only to that identifier 104. That is to say, the entity's behavior in the first information domain 100 is not, without further work, tied to the entity's identifier 106 in the second information domain 102.

An "operator" 108, 110 is shown in each of the information domains 100, 102. This term "operator" is to be taken very generally and is defined by its actions as described in the present discussion and in the claims. One operator 108 is the cable-television provider in a media-providing information domain 100, but other possible operators include processes, such as one providing local viewing content or advertising, that have some access to the presence 104 of the entity in this particular domain 100. In general, there can be multiple operators 108 within a given domain 100. The domain 100 can include operators 108 provided by competing commercial concerns, each operator 108 providing coupons and advertisements and otherwise promoting their products and services. A good example of a proliferation of operators is a web page whose general outline is provided by one operator but which includes content, possibly actionable content, from many other operators such as news and weather services, other RSS feeds, advertising, and the like.

Much of what has just been described (here called the "first logical portion" of the environment of FIG. 1) is well known in the art and is probably familiar to the reader (at least in some form or other). That is not the case for the "second logical portion" which includes the broker 112, the binder 114, and the incentivizer 118. The bulk of the present discussion clarifies these applications, their operations, and their interactions with the other portions of FIG. 1. For now, a short introduction of each may be useful.

The binder 114 discovers, by various techniques described below, that the presence identifiers 104 and 106 in the two information domains 100 and 102, respectively, are in fact associated with the same entity. That is to say, the binder 114 "binds together" the two (or more) presence identifiers 104, 106 of the entity. This binding can be very useful because it allows for the gathering of "cross-domain" intelligence. In general, at least one operator 108, 110 in each information domain 100, 102 observes and records the behavior of the entity within that one particular information domain. The work of the binder 114 allows a larger, cross-domain, picture of the entity's behavior to be developed.

The broker 112 analyzes the observed behavior of the entity as recorded in several information domains 100, 102 and tries to draw useful conclusions from the analysis. The broker 112 works closely with the binder 114. In some embodiments, the broker 112 feeds behavioral observations gathered from the several domains 100, 102 to the binder 114 to allow the binder 114 to try to correlate the presence identifiers 104, 106 across the domains 100, 102. In some embodiments, the output of the binder 114 is used by the broker 112 as the broker 112 develops cross-domain intelligence.

Because each information domain 100, 102 operates separately and closely guards the behavioral observations it makes within its own domain (both for monetary and security reasons), an incentive may need to be given to "pry loose" some of this information so that the binder 114 and the broker 112 can be more effective. That is one purpose of the incentivizer 118. In some embodiments, the incentivizer 118 represents the interests of a particular commercial concern or other organization (e.g., those of the interested party 116). In other cases, the incentivizer 118 is a neutral party. Security issues, discussed below, flow from these possible allegiances of the incentivizer 118.

Finally, the "third logical portion" of FIG. 1 is the interested party 116. This is a consumer (and possibly a purchaser) of the cross-domain intelligence generated by the broker 112 (as the broker 112 works in conjunction with the binder 114 and with the incentivizer 118). In many embodiments, this interested party 116 is a business or other commercial concern. It wants, as potentially valuable marketing intelligence, the cross-domain behavioral analysis provided by the broker 112. However, simply giving that analysis to the interested party 116 may be a threat to the confidentiality of the entity. Several aspects of the present invention are focused on the problem of providing valuable cross-domain information to the interested party 116 while maintaining the confidentiality, and the confidence, of the entity.

The arrows in FIG. 1 are meant to suggest information flows, but they are not definitive. Particular embodiments are supported by particular information flows, and these are detailed in the discussion below.

Figure 2:
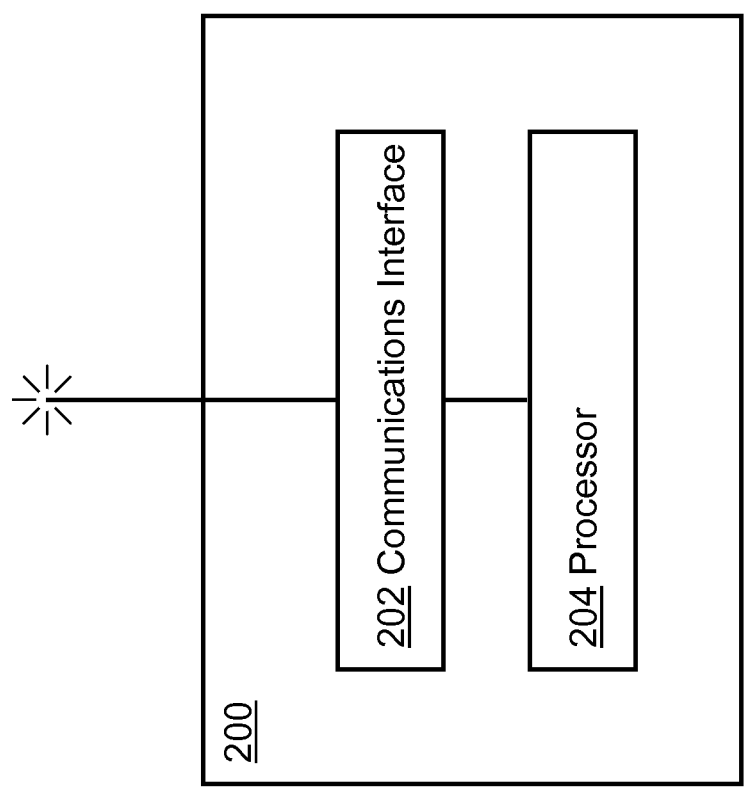
FIG. 2 is a schematic of a compute server than can host aspects of the present invention.

An exemplary compute server that can host aspects of the present invention is shown in FIG. 2. A communications interface 202 allows the compute server 200 to communicate with other processes as shown in FIG. 1, and a processor 204 can run the methods described below. Note, however, that there need not be a one-to-one mapping between a process from FIG. 1 (such as the broker 112, binder 114, or incentivizer 118) and a compute server 200. In some embodiments, for example, the broker 112 and the binder 114 are processes both running on a single compute server 200. In other embodiments, the methods of the binder 114 (or of the broker 112 or incentivizer 118) are distributed among several servers 200. Portions of these processes 112, 114, 118 may even be delivered to and run on a server 200 run by an operator 108 or on equipment (e.g., a set-top box or cellphone) owned by an entity. In sum, consider the broker 112, binder 114, and incentivizer 118 to be methods whose steps are hosted on one or more compute servers 200 or on other computing devices as particular implementations require.

At this point, the present discussion turns to exemplary embodiments of the binder 114, broker 112, and incentivizer 118. Later, examples are given that describe how all of the elements of FIG. 1 can work together.

Figure 3A:
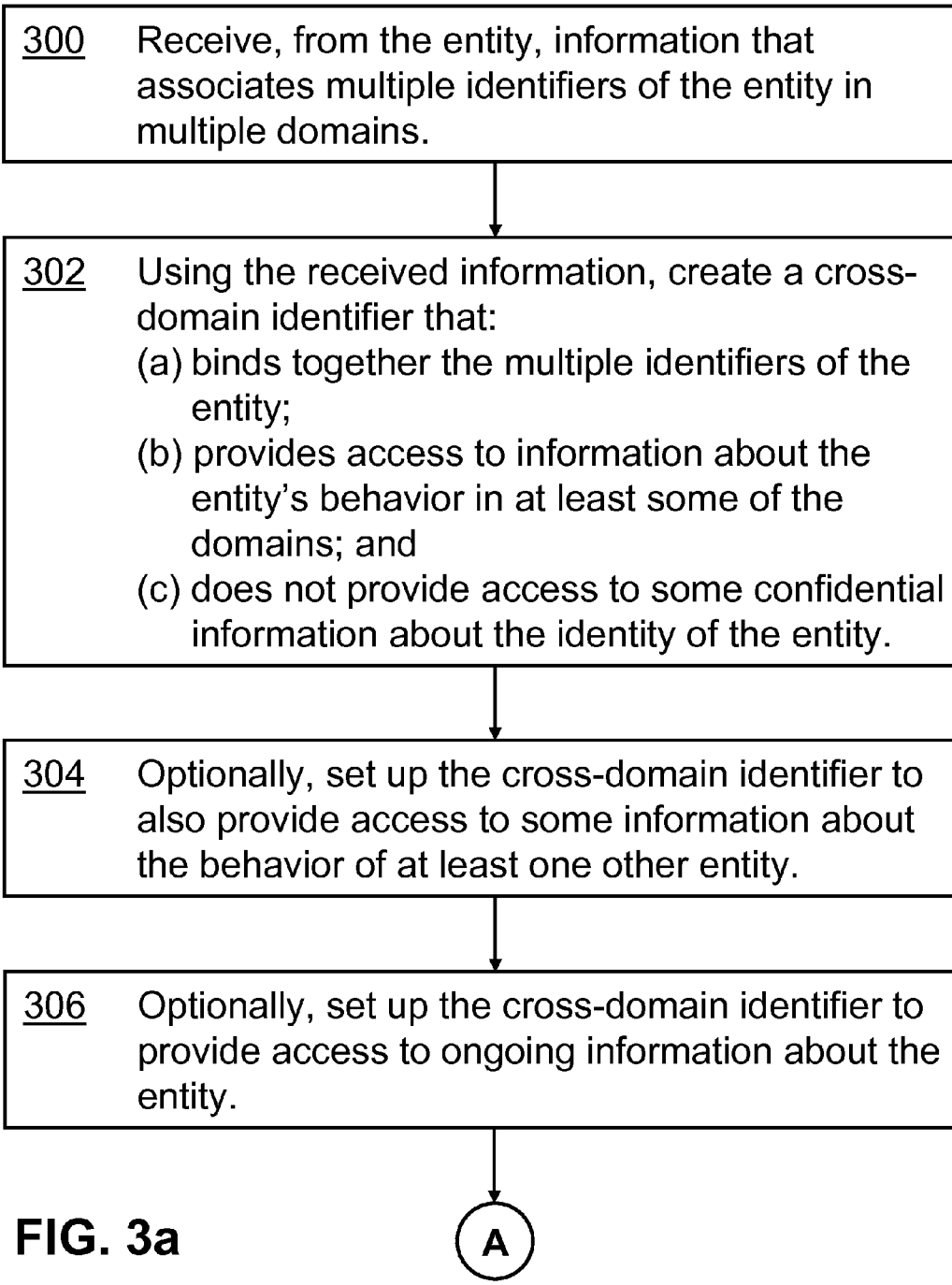
FIGS. 3a and 3b together form a flowchart of a first exemplary method for binding together identifiers across information domains.
Figure 3B:
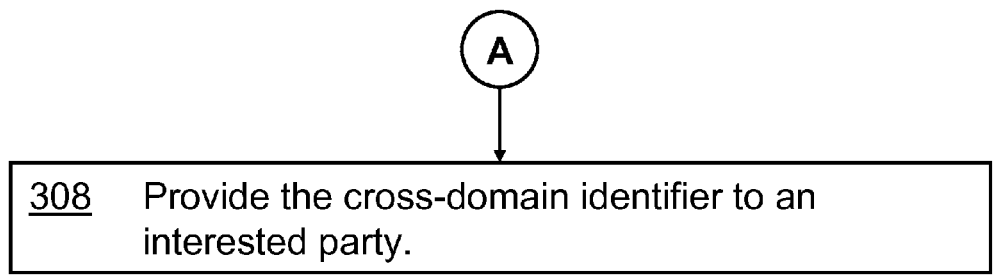

A first technique usable by the binder 114 is illustrated in FIGS. 3a and 3b. The method begins at step 300 of FIG. 3a where the entity itself gives the binder 114 enough information to bind together the entity's presence identifiers 104, 106. In a straightforward example of this, the binder 114 (or the broker 112 acting on behalf of the binder 114) establishes a web site that invites the entity to log in and list his presence identifiers 104, 106. Also, when the entity uses one of the presence identifiers 104, 106, he can be invited to provide information about whatever other presence identifiers 104, 106 he may have. The entity can be given coupons or other monetary or non-monetary rewards to induce him to divulge this information. The entity is assured that this information will not be abused, and that the privacy of the entity will not be compromised.

In a somewhat less straightforward example, the binder 114 still gets the necessary binding information from the entity but gets the information indirectly. For example, the entity may perform a cross-domain transaction that contains enough information to perform the binding, and that cross-domain transaction is observed by the binder 114. An example of this involves an electronic coupon given to the entity in the first domain 100 and redeemed in another 102. (Permutations of this example are described below.) The coupon as issued is associated with a first presence identifier 104 of the entity in the first domain 100 (which in this example can be a media-providing domain). (The coupon "is associated with" the first presence identifier 104 by, for example, encrypting the presence identifier 104 within the electronic coupon.) When the coupon is redeemed in a retail domain 102, the entity uses the loyalty card issued to him by the retailer. This loyalty card serves as the entity's presence identifier 106 in the retail domain 102. When the binder 114 is informed about the coupon clearance (this informing is described in detail below), the binder 114 reasonably concludes that the two presence identifiers 104, 106 associated with the coupon belong to the same entity, and the binder 114 performs the binding.

Depending upon the particular nature of the information domains 100, 102, the binder 114 can use other ways to gather the binding information indirectly from the entity. Instead of a coupon, a contest entry issued to the entity in one domain 100 and redeemed in another domain 102 can provide the information necessary to perform the binding. Even more indirect, the entity can purchase a product in a retail domain 100 and then post a review of the product in an on-line social domain 102. If the purchase and review can be tied together, then the binder 114 can bind together the presence identifiers 104, 106 of the entity in these two domains. As can be imagined, each particular type of information domain 100, 102 supports particular types of observable behavior, and those particular types of observable behavior can often be correlated across domains to allow the binder 114 to perform the binding.

Note that in some situations, the information used by the binder 114 reveals the actual identity of the entity. In other situations, the binder 114 only has a pseudonym of the entity to work with and attempts to resolve that pseudonym to an actual presence identifier 104, 106 when performing the binding. In some situations, the binder 114 cannot resolve the pseudonym to an actual presence identifier 104, 106 but performs the binding on the pseudonym itself.

Regardless of how the binder 114 receives the necessary information, the binder 114 performs the binding and then produces, in step 302 of FIG. 3a, a "cross-domain identifier." As the output of the binding process, the cross-domain identifier is an important concept. In short, it provides access to the binding and, in consequence, access to some behavioral observations concerning the entity in at least some of the domains 100, 102 involved in the binding. However, because the privacy of the entity is a major concern, the cross-domain identifier is so constructed that it does not allow access to all information about the entity.

FIG. 4 presents an idealized structure for the cross-domain identifier 400. FIG. 4 shows that by accessing the cross-domain identifier 400, a party is given access to some behavioral information 402, 404 associated with the entity. Consider the case where the first information domain 100 is a media-providing domain, and the second information domain 102 is a retail domain. Then, after the cross-domain identifier 400 is constructed binding together the entity's presence identifiers 104, 106 in these two domains 100, 102, the cross-domain identifier 400 may provide access to observations 402 of media-consumption activities (e.g., what shows and advertisements the entity watched) from the first domain 100 and access to observations 404 of retail activities (e.g., a list of products purchased by the entity, products scanned but not purchased, and interactions with intelligent signs and advertisements) from the second domain 102.

Note, however, that for privacy reasons, the cross-domain identifier 400 generally does not provide access to the entity's presence identifiers 104, 106 themselves because that could lead to a loss of privacy. Also, even if the binder 114 has gathered information that could reveal the identity of the entity, that information is generally not made accessible through the cross-domain identifier 400. This potentially identity-revealing information can include, in addition to the presence identifiers 104, 106, information about the entity's name, address, telephone number, credit-card and bank-account numbers, social-security numbers, automobile license plate number, other identifiers, biometrics such as voice samples, photographs, and software or hardware identifiers (including tokens or "cookies").

Even withholding access to the entity's presence identifiers 104, 106 and information about the entity's identity may not provide enough security in some situations, however. Therefore, in these situations, the cross-domain identifier 400 is constructed to only give access to general information about behavior rather than giving access to specific instances of observed behavior. As one example, in step 304, the cross-domain identifier 400 is constructed to provide access to information about a number of entities. That information may be accessible on an entity-by-entity basis or may only be available as statistical results covering a population of entities. An entity's confidential information is more carefully guarded when the cross-domain identifier 400 only provides access to the results of high-level analysis. That type of information is very valuable to many potential interested parties 116, and indeed several interested parties 116 may only want the high-level analysis. In some embodiments, the price that the interested party 116 pays for access to a cross-domain identifier 400 is determined, in part, by the level of behavioral detail that the interested party 116 can access through the cross-domain identifier 400. As discussed below, the cross-domain identifier 400 can be more valuable if it points to information extracted by an analysis of a large population.

Different embodiments of the binder 114 create different types of cross-domain identifiers 400. As one example, the cross-domain identifier 400 can be created to provide access to either static or dynamic data. One way to provide safe access to static data is to extract behavioral data from the information domains 100, 102, scrub that data to remove identity-revealing or other confidential data, and then create the cross-domain identifier 400 to point to the scrubbed data. Whenever the interested party 116 wants updated information, the process is repeated (although the binding itself presumably need not be performed again), and a new cross-domain identifier 400 is given to the interested party 116 (possibly on a subscription basis).

Step 306 of FIG. 3a allows for embodiments wherein the cross-domain identifier 400 provides access to ongoing information. A simple implementation of this would have the cross-domain identifier 400 point to the actual source of the gathered behavioral observations as they are made in each information domain 100, 102. (Each domain 100, 102 may have at least one operator 108, 110 that gathers this information. Then, the interested party 116 could, via the cross-domain identifier 400, view "live" observations in the information domains 100, 102 as they are taken. It is expected, however, that in many situations this simple implementation would be very difficult to secure against privacy invasions. Also, the owners of the information domains 100, 102 may regard this as giving up control of their valuable information. Thus, many implementations, even those that provide access to ongoing information, support a more sophisticated interaction between the cross-domain identifier 400 and the information-providing operators 108, 110 in each domain 100, 102. This interaction possibly includes monetary compensation for providing the information, that is, the interested party 116 may pay to subscribe to the cross-domain identifier 400, while the provider of the cross-domain identifier (possibly the broker 112, discussed below) or the incentivizer 118 pays the operators 108, 110 to have access to the ongoing information.

The process ends with step 308 of FIG. 3b when the cross-domain identifier 400 is provided to an interested party. This has been discussed already, so it only need be noted that the "interested party" of step 308 may be the broker 112 that may use the cross-domain identifier 400 for its own purposes (see the discussion below) and that may in turn offer the cross-domain identifier 400 to the interested party 116 of FIG. 1 for a fee. Also, the binder 114 may give one version of the cross-domain identifier 400 to the broker 112 and, for security or commercial reasons, give another version of the cross-domain identifier 400 to the interested party 116. The two versions allow access to different types of information.

Figure 5A:
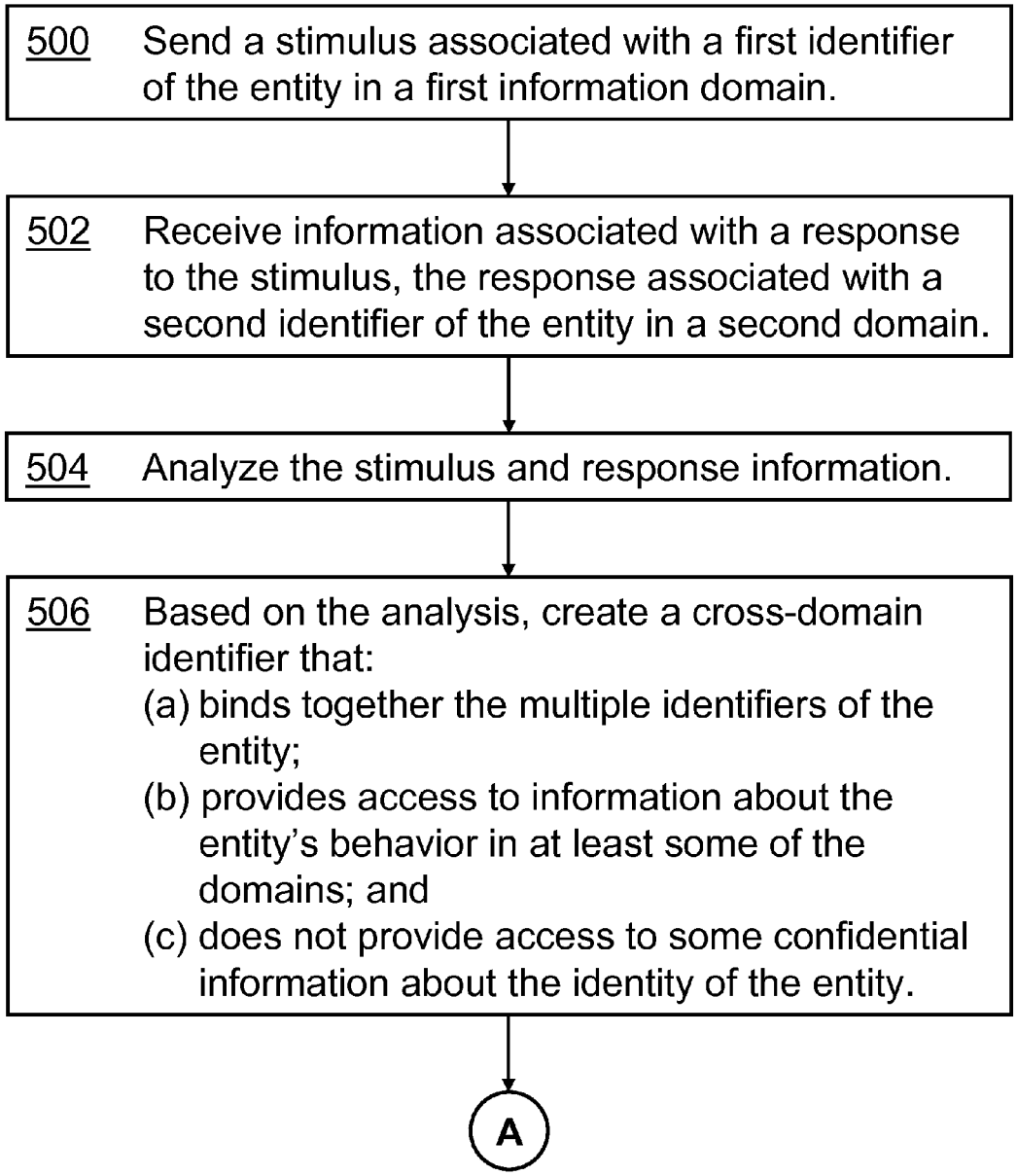
FIGS. 5a and 5b together form a flowchart of a second exemplary method for binding together identifiers across information domains.
Figure 5B:
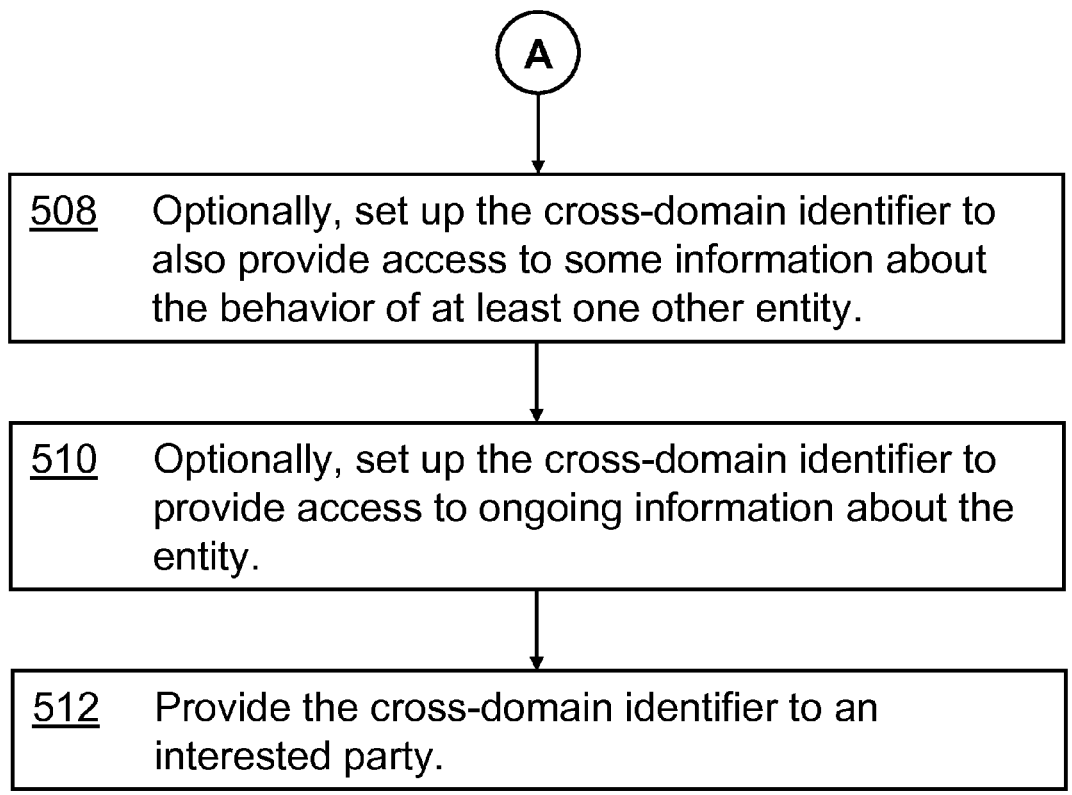

FIGS. 5a and 5b present a different method usable by the binder 114. The difference between this method and the method of FIGS. 3a and 3b lies in how the binder 114 receives enough information to perform the binding of the entity's presence identifiers 104 and 106. The method of FIGS. 5a and 5b begins at step 500 when a stimulus is created in association with a first presence identifier 104 of the entity in the first domain 100. The stimulus here is intended to induce the entity to perform a specific cross-domain operation. Turning to our familiar example, the stimulus can be a coupon, electronically formed to include an association with the entity's presence identifier 104. Such entity-specific coupons are already known (even though the use of them as in the method of FIGS. 5a and 5b is new) and are sent, for example, in e-mail advertisements or are downloadable from a web site once the entity has asserted one of his identifiers by logging in. Other stimuli are possible including contest entries.

Note that although the binder 114 will eventually use the information generated by the response (in step 504 below), the stimulus need not be sent by the binder 114 itself. Examples are given below where the broker 112 or an operator 108 actually prepares and sends the stimulus.

If the stimulus fails to induce the desired response, then the method of FIGS. 5a and 5b is unsuccessful. If, on the other hand, the stimulus is successful, and the entity performs the induced action, information about that induced action is received by the binder 114 in step 502. For example, the induced action can be redemption of the coupon or contest entry in the second domain 102, the redemption associated with the presence identifier 106 of the entity in that domain 102. For a product coupon, the presence identifier 106 can be the retail loyalty card as presented by the entity when he purchases the product at a retail outlet.

In step 504, the binder 114 analyzes the stimulus and the response and, based on that analysis, binds together the two presence identifiers 104, 106 as belonging to the same entity. In the simplest scenario, this binding is possible because the coupon is so constructed so that only the entity who is the original recipient of the coupon (as designated by the first presence identifier 104) is allowed to redeem the coupon (as designated by the second presence identifier 106).

A more complicated scenario is also possible. The original recipient of the coupon may be allowed to pass the coupon on to a friend who is then allowed to redeem the coupon for himself. The coupon can be constructed so that an electronic "chain of custody" is created. This chain-of-custody information is given to the binder 114 in step 502. From the chain, the binder 114 can bind together the friend's presence identifier in the coupon-providing domain with the friend's presence identifier in the retail domain when the friend redeems the coupon. In this scenario, of course, there is not enough information to bind the presence identifiers of the original coupon recipient.

Once the binder 114 binds the presence identifiers of the coupon's redeemer (whether or not that is the same entity that originally received the coupon), the method of FIGS. 5a and 5b proceeds in parallel with the method of FIGS. 3a and 3b. A cross-domain identifier 400 is created in step 506. The cross-domain identifier 400 may provide information about a population of customers (step 508 of FIG. 5b) and may provide access to ongoing behavioral information (step 510). The cross-domain identifier 400 is provided to an interested party in step 512.

Before leaving the method of FIGS. 5a and 5b, one point should be noted. If the coupon is redeemed but not by the original coupon recipient, then the chain-of-custody is itself potentially valuable information. It may be reasonably inferred that the original recipient is a friend or acquaintance of the second person in the chain, the second person is a friend or acquaintance of the third person in the chain (if any), and so on. Thus, by observing the passing on of the coupon, the method of FIGS. 5a and 5b can generate useful information about social contacts. While not specifically relevant to the task of binding together presence identifiers, this information can be passed along to the broker 112 that may be able to use it.

Figure 6A:
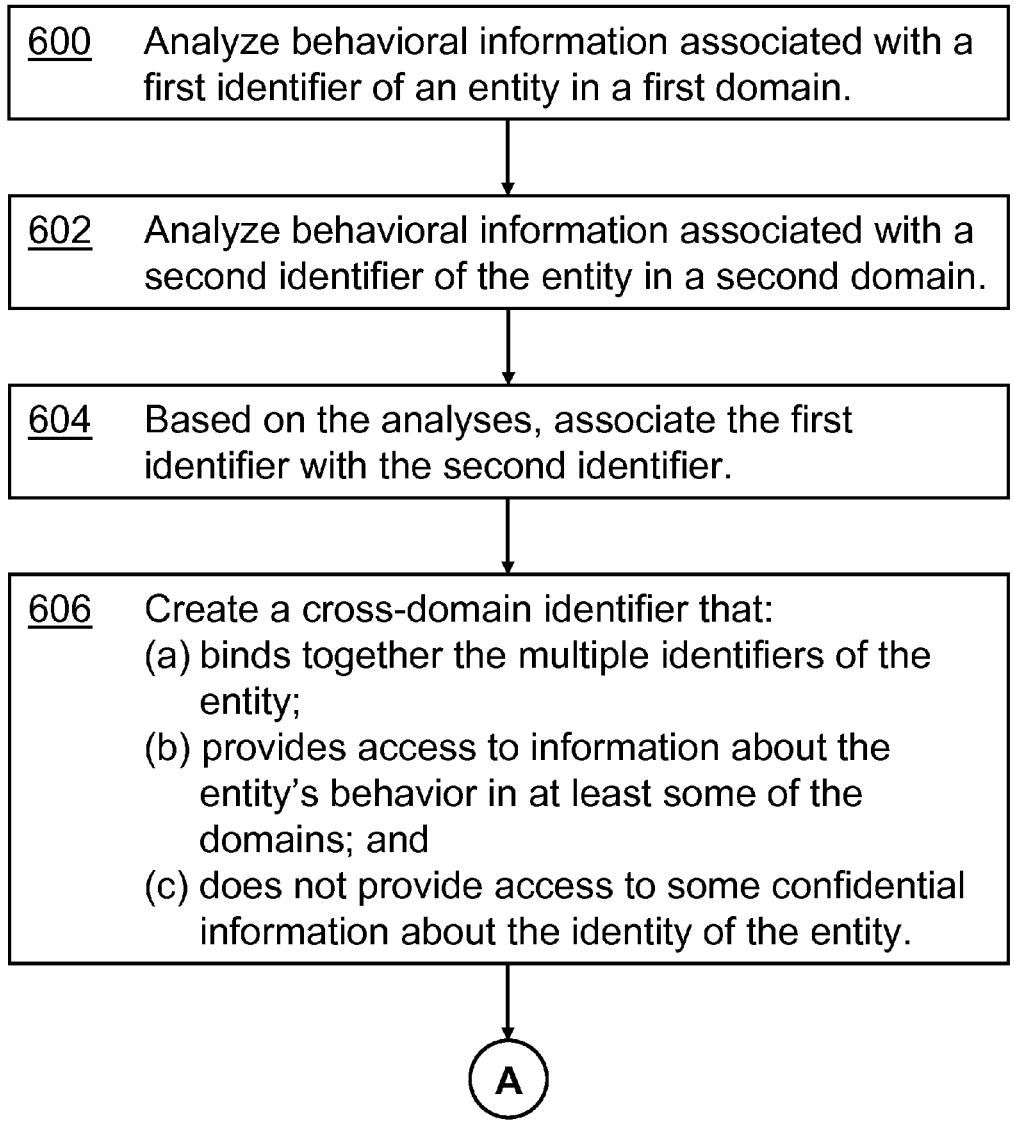
FIGS. 6a and 6b together form a flowchart of a third exemplary method for binding together identifiers across information domains.
Figure 6B:
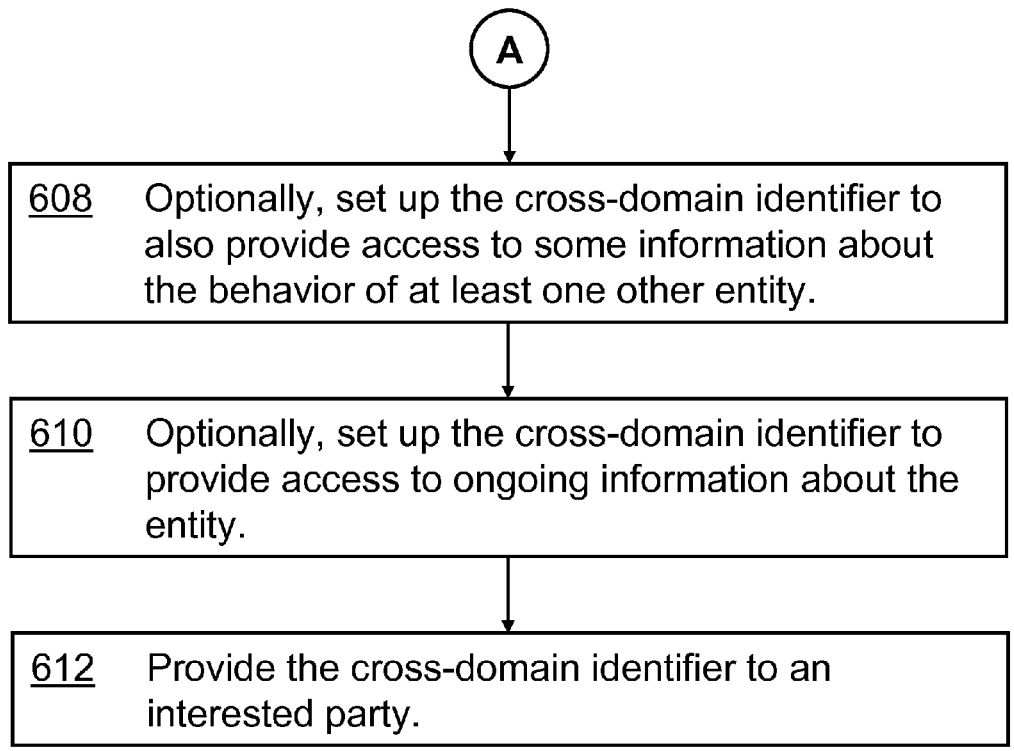

Yet another binding method is presented in FIGS. 6a and 6b. In step 600, the behavior observed in a first domain 100 is analyzed. Each usable piece of information is associated with one or more presence identifiers 104. Then in step 602, the behavior observed in a second domain 102 is analyzed. Again, the usable observations are associated with one or more presence identifiers 106. In step 604, the binder 114 attempts to extract from these observations likely bindings of presence identifiers 104, 106 in the two domains.

The word "likely" in the previous sentence is instructive. The method of FIGS. 6a and 6b may sometimes produce definitive bindings, but at other times this method can only produce reasonable hypotheses. For example, a soft drink purchased in a retail domain might be associated with a recent viewing of an advertisement for that soft drink presented in a media-providing domain, but without more information, it would be difficult to bind together the presence identifiers of the entity that watched the advertisement with the entity that purchased the soft drink. However, that "more information" is becoming more readily available as operators 108, 110 in the domains 100, 102 become more aware of how valuable behavioral observations can be and thus make the effort to gather more information.

It should be noted that in steps 600 and 602, the binder 114 may need to process behavioral observations associated with innumerable presence identifiers 104, 106 and thus with innumerable entities before beginning to construct even hypothetical bindings. This method, in contradistinction to the binding methods of FIGS. 3a, 3b, 5a, and 5b mostly rewards only those binders 114 that have access to information on large populations of entities. Also, the more information domains available to the broker 114 for analysis, the better, as the broker 114 may be better able to extract patterns of behavior when more examples in more domains are available for contemplation.

Once the binding in made in step 604, this method follows the previous methods by creating a cross-domain identifier 400 in step 606. However, because the bindings produced by the method of FIGS. 6a and 6b are often based on statistical probabilities rather than on observed certainties, the cross-domain identifier 400 may include some indication of how much confidence the binder 114 has in this particular binding.

Note that in step 608 of FIG. 6b, the cross-domain identifier 400 may include population statistics about multiple entities, just as in the previous methods. Be aware that this is another statistical step in addition to the statistics that the method of FIGS. 6a and 6b often applies when proposing a single binding (in step 604 of FIG. 6a). If the binder 114 is fortunate enough to have access to information on large populations of entities, then the value of this statistical population information may completely outweigh any concern about the uncertainty associated with any particular binding.

As is already familiar from the discussion of the previous binding methods, step 610 optionally constructs the cross-domain identifier 400 to have access to ongoing, rather than only to static, behavioral observations. This step 610 has a special significance in the current method, however, because as more observations are made and analyzed in steps 600 and 602, the level of confidence that a binding proposed in step 604 is actually correct can increase (or decrease if counter-examples are found). Subscribers to ongoing information are thus given better and better information as time goes on.

In step 612, the cross-domain identifier 400 is offered to an interested party.

Before leaving the discussion of binding methods to talk about the broker 112, it should be noted that the three binding methods given above need not be implemented in separate embodiments. A single binder 114 can use whatever method, or whatever combination of methods, is most appropriate given the information resources it is allowed to analyze. Also, the steps in each flowchart need not occur exactly in the order given. For example, the binder 114 may be always "pre-analyzing" behavioral information and then only create actual bindings when called upon to do so. Again, especially in the case of the method of FIGS. 6a and 6b, the binder 114 may need to revisit a cross-domain identifier 400 that it earlier produced when the binder 114 comes upon more information that either throws the previous binding into doubt or increases the level of confidence in that binding.

Figure 7A:
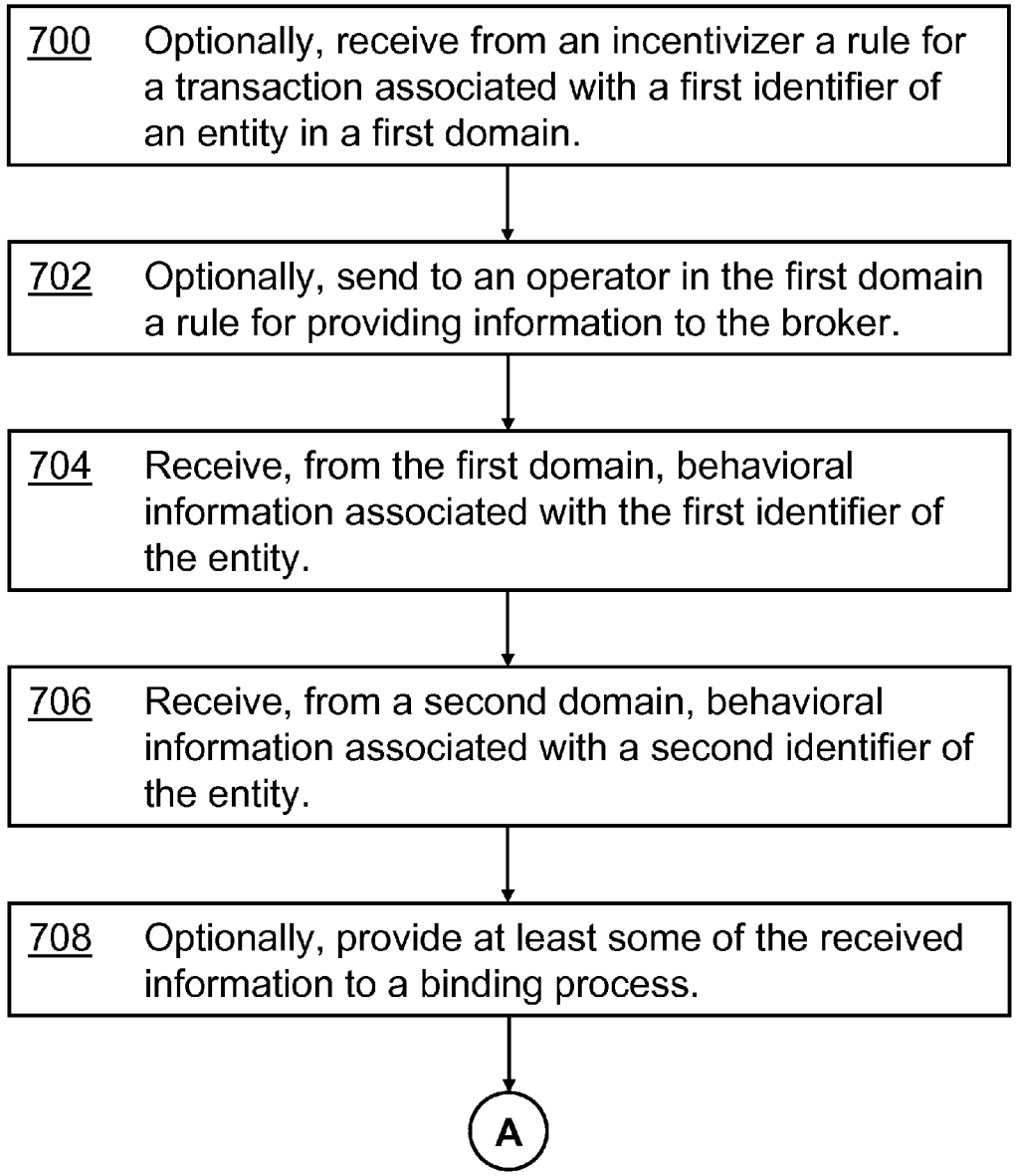
FIGS. 7a and 7b together form a flowchart of a first exemplary method for brokering cross-domain information.
Figure 7B:
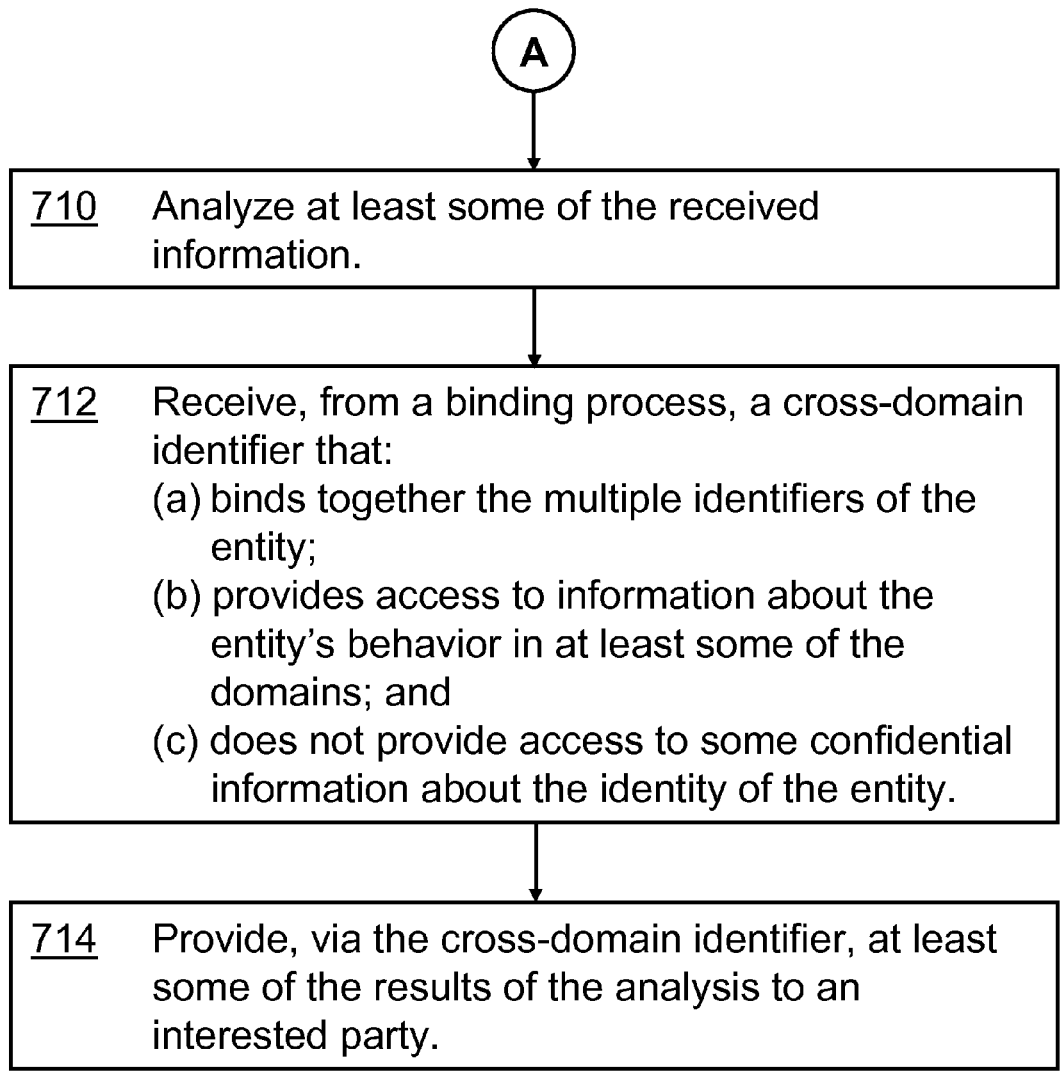

Now turning to the broker 112, FIGS. 7a and 7b present a first exemplary method. Ignore the first two steps 700, 702 of FIG. 7a for the moment. In step 704, the broker 112 receives behavioral observations from an operator 108 in the first information domain 100. As mentioned above in reference to step 600 of FIG. 6a, the usable observations are usually associated with one or more presence identifiers 104. However, the broker 112 can also make use of observations that are not tied to a specific presence identifier 104. In step 706, the broker 112 receives behavioral observations from an operator 110 in the second information domain 102. These steps 704, 706 are repeated for as many information domains as the broker 112 is allowed to monitor. In the method of FIGS. 7a and 7b, these steps 704, 706 continue on as long as the broker 112 is operating. (Note that in some embodiments, the broker 112 receives the information of steps 704 and 706 in association with the cross-domain identifier 400 received in step 712, described below. In those embodiments, steps 704 and 706 are sub-steps of step 712.)

As mentioned above in reference to the variously described exemplary binding methods, the broker 112 in some embodiments sends at least some of the received observations to the binder 114 in step 708.

In step 710 of FIG. 7b (another ongoing step along with steps 704 and 706), the broker 112 analyzes the received observations and attempts to extract meaningful intelligence from them. The broker 112 is in a unique position to make this analysis, because the broker 112 is trusted to receive confidential information. This intelligence is one of the chief products of the broker 112.

In some embodiments, the broker 112 receives, in step 712, the cross-domain identifier 400 created by the binder 114. There are several reasons why this may happen. In one case, although the broker 112 is trusted to receive confidential information, security may be enhanced if the most confidential information (that is, the information that leads to the binding of presence identifiers across domains) is handled by the binder 114 in a separate process. Here, the broker 112 itself makes no attempt to associate behavioral observations across domains but leaves that task to the binder 114.

In a second case, the binder 114 always works behind the scenes and works exclusively through the broker 112 both to receive the behavioral observations on which the binder 114 operates and to send out the cross-domain identifiers 400 that encapsulate the bindings it produces.

In step 714, the broker 112 provides results of its analyses to an interested party 116. For security's sake, these results can be provided via a cross-domain identifier 400 created by the binder 114. The broker 112 may sell this information or exchange it for something else of value.

As described above in reference to the cross-domain identifier 400, the information accessible through this identifier 400 may be specific to one entity operating across domains or may include statistics about a population of entities. In some cases, only the highest-level results of the analysis of the broker 112 are provided. The fee charged by the broker 112 can vary depending upon the depth of the analysis and upon the amount of detailed information provided. Again as mentioned above, this information may be continually updated on an ongoing basis.

Return now to step 700 of FIG. 7a. In some embodiments, the broker 112 works closely with one or more incentivizers 118 (described in more detail below). Sometimes, the incentivizer 118 works through the broker 112 to access an information domain 100. In step 700, the broker 112 receives instructions from the incentivizer 118 detailing what the incentivizer 118 wants the broker 112 to do. For a first example, the incentivizer 118 can tell the broker 112 what type of analysis it wants to see. Note that in some cases, the incentivizer 118 is working directly for an interested party 116. If so, then the incentivizer 118 cannot have the same level of access to confidential information in the domain 100 that the trusted broker 112 enjoys. Thus, requests for specific kinds of analysis (including specifics about data gathering) are often made through the trusted broker 112.

In a second example, the rule from the incentivizer 118 specifies particular actions that the incentivizer 118 wishes to have happen in the domain 100. Recall the stimulus/response method of binding described above in reference to FIGS. 5a and 5b. The incentivizer 118 can tell the broker 112 in step 700 of FIG. 7a what kinds of stimuli the incentivizer 118 wishes to send into the domain 100. The incentivizer 118 can also specify the types of entities that should receive the stimulus, and the trusted broker 112 may be the only entity outside the domain 100 that knows enough about the entities to fulfill this request.

Step 702 is a natural follow-on to step 700 in some situations. Here the broker 112 sends a rule to an operator 108 in the first domain 100. The rule specifies those types of behavioral observations that are of interest to the broker 112. Continuing the example of the stimulus rules sent by the incentivizer 118 to the broker 112 in step 700, the broker 112 may not actually be in a position to send the stimuli itself but may send a rule (or download an application that embodies a rule) to the operator 108, and the operator 108 performs according to the rule.

Figure 8A:
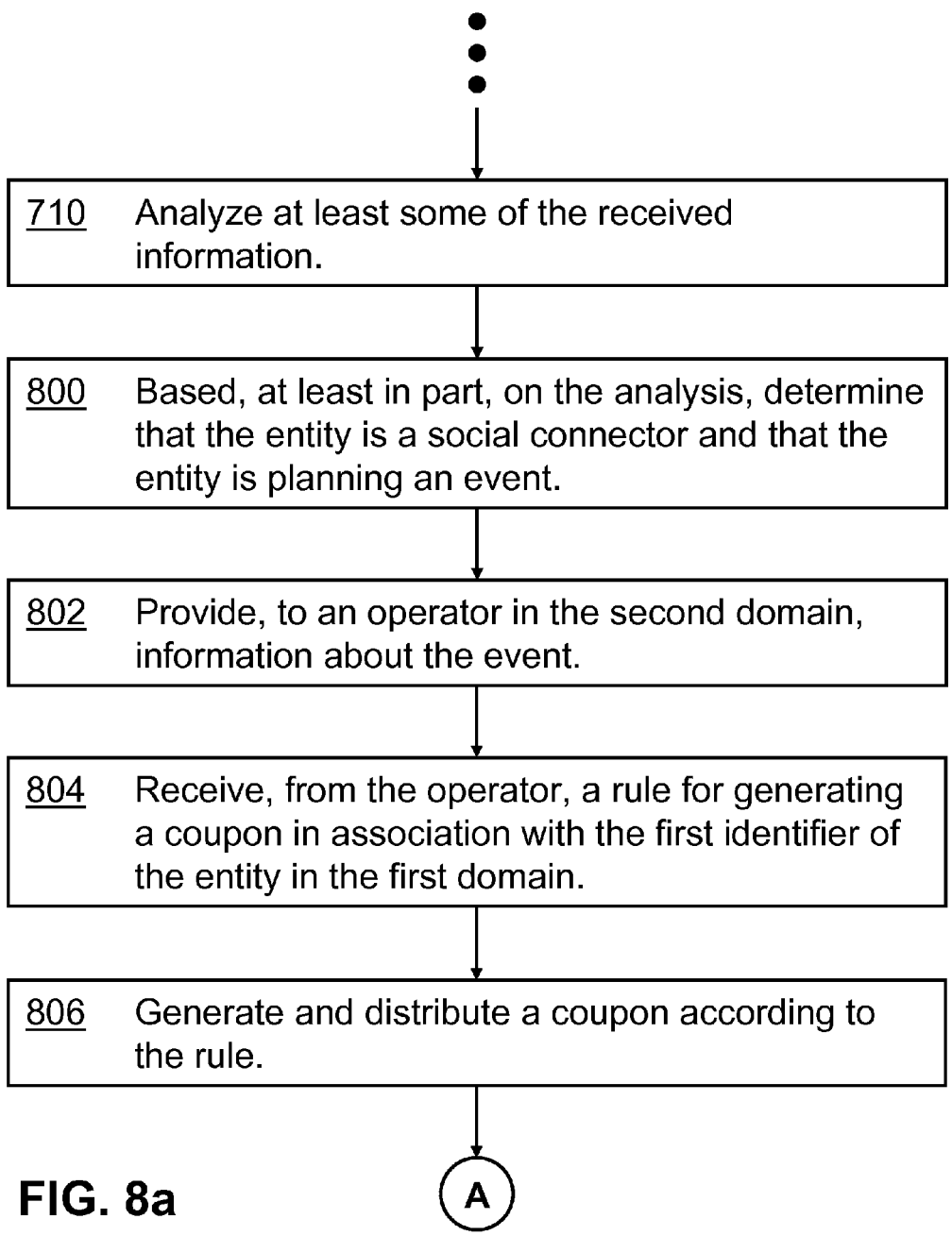
FIGS. 8a and 8b together form a flowchart of a second exemplary method for brokering cross-domain information.
Figure 8B:

In general, the behavior analyzed in steps 704 and 706 can be any behavior observed by the operators 108, 110 in the various domains 100, 102 including media-consumption behavior, retail behavior, behavior with respect to a social or other association, and the like. FIGS. 8a and 8b provide a rather specific example of behavior that the broker 112 may analyze. The method begins as in the method of FIGS. 7a and 7b. In step 710 of FIG. 8a, the broker 112 analyzes the received behavioral observations.

Because of its analysis, the broker 112 concludes, in step 800, that an entity who has a presence in the first information domain 100 is a "social connector." A social connector is a person who is a hub for a social network; other people in the network communicate with this person to discuss and plan social events. (This social network may be very informal: co-workers, a scratch bowling team, couples in the neighborhood with similar-age children). The broker 112 notices this person and concludes that he is a social connector by reviewing communications records such as telephone call logs, SMS logs, e-mails, and the like.

The broker 112 is also able to conclude that the social connector is planning an event. Again, communications records can be revealing: The social connector very recently called several local banquet facilities, for example.

The intelligence that the broker 112 extracts in step 800 can be quite valuable to businesses that provide products or services for events. Thus, in step 802, the broker 112 attempts to sell this information to interested parties 116 working in a second domain 102. By knowing something about the event (especially, by knowing more about the event than any of the potentially interested parties 116 can know), the broker 112 can pick one or more parties 116 that may reasonably be interested in this information. Through a competitive bidding process or otherwise, the broker 112 picks its customers 116 in step 802 and sells them information about the social connector and about the event. At all times, the broker 112 preserves the confidentiality of the entity and does not disclose personally identifiable information.

The interested parties 116 decide how they want to approach the social connector. For example, an interested party may choose to send a coupon for a relevant product or service to the social connector. For security's sake, the interested party 116 may not be given enough information in step 802 to do this directly, so the interested party 116 sends a coupon-generating rule to the broker 112 in step 804. Although the interested party 116 is in general not an incentivizer 118, the broker 112 receives and processes the rule in the same manner as discussed above in reference to step 700 of FIG. 7a (where the broker 112 receives a rule from an incentivizer 118). In step 806 of FIG. 8a, the broker 112 takes action based on the rule, for example by generating and sending a coupon or by instructing an operator 108 in the first domain 100 to do so.

In step 808 of FIG. 8b, the broker 112 receives information about the redemption of the coupon. Of course, if this coupon is redeemed in association with a second presence identifier 106 of the entity in a second information domain 102, then the broker 112 can send this information to the binder 114 to bind together the entity's two presence identifiers 104, 106. In other situations, the binding was done before the interested party 116 got involved. Even if the binding was not done and cannot be done (e.g., the coupon was redeemed, but the entity did not use a retail loyalty card), the broker 112 has still provided a valuable service to the interested party 116 and, through that party 116, to the social connector himself.

The discussion next turns to the incentivizer 118. As its name suggests, the role of the incentivizer 118 is to incent operators with presences in the information domains 100, 102 to perform in specific ways. In many instances, the desired outcome of the incented behavior is the creation of information usable by the binder 114 to bind together the presence identifiers 104, 106 of an entity across the domains 100, 102.

Figure 9A:
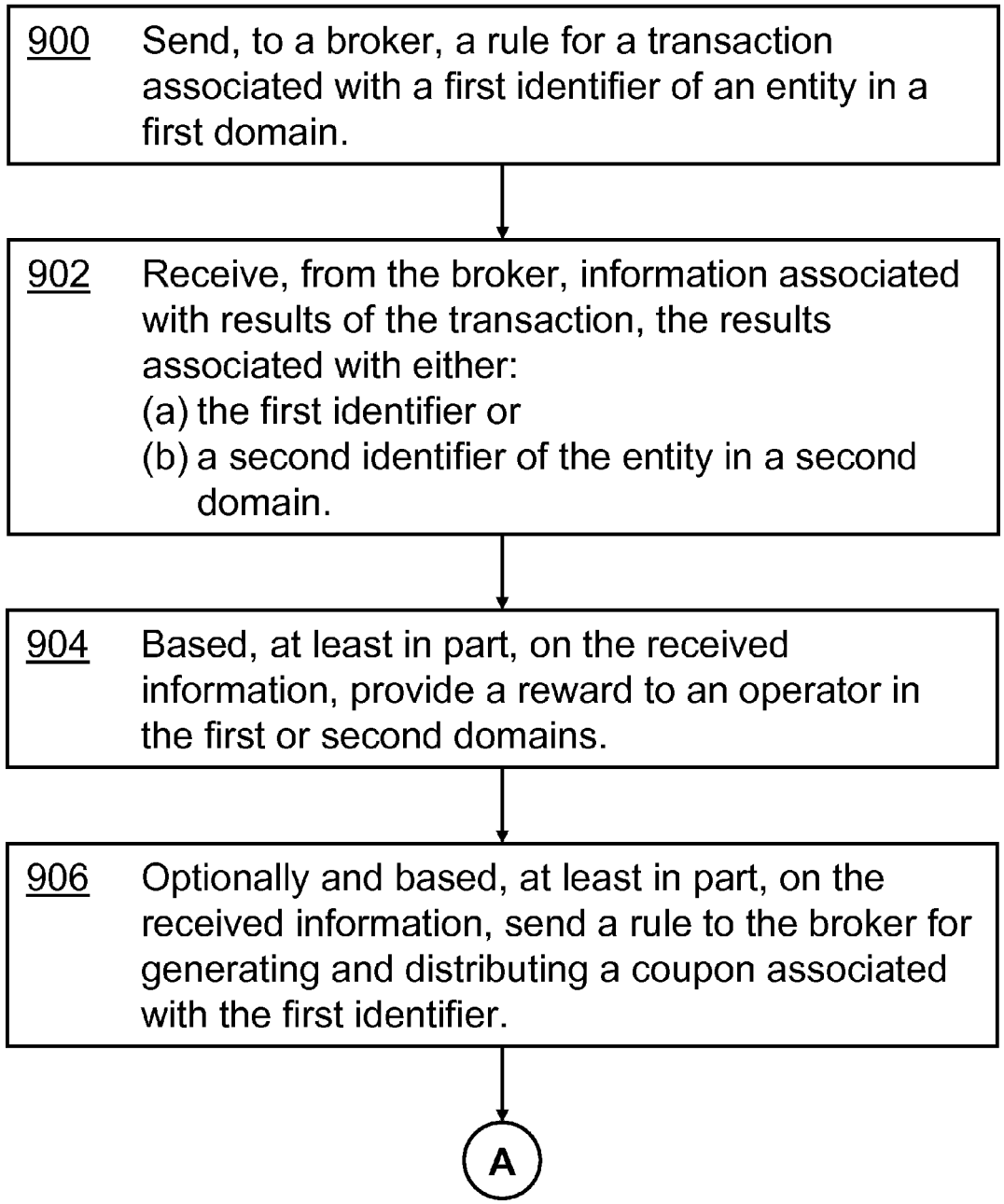
FIGS. 9a and 9b together form a flowchart of an exemplary method for incenting an operator in a domain to provide information about the presence of an entity in that domain.
Figure 9B:
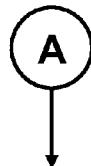

FIGS. 9a and 9b present an exemplary method usable by the incentivizer 118. In step 900, the incentivizer 118 sends to the broker 112 a rule for carrying out an operation in the first domain 100. (This is the same rule that the broker 112 receives in step 700 of FIG. 7a, discussed above.) In the particular embodiment of FIGS. 9a and 9b, this rule specifies how a particular transaction is to begin, that is to say, how to contact an entity via the entity's presence identifier 104 in the first domain 100 and how to persuade the entity to perform in a specific manner. (In other embodiments, the incentivizer 118 can operate without contacting the entity.) In this embodiment, the incentivizer 118 operates through the broker 112 because, as noted above in the discussion of the broker 112, the broker 112 often has access to an operator 108 in the domain 100 that the incentivizer 118 does not have.

If the entity accepts the stimulus presented by the broker 112, then the entity acts in a specified manner, and in step 902, the incentivizer 118 receives results of the action. The transaction may occur all in the first domain 100 (in this case, the entity may not even have a presence identifier in a second domain), in which case the results are associated with the presence identifier 104 of the entity in that domain 100. Other transactions occur across domains, so that the results are associated with the presence identifier 106 of the entity in the second domain 102. In some embodiments, the incentivizer 118 is given statistical information about the results of its efforts but is not provided with information about specific transactions.

Turning back to our common example of the coupon, the incentivizer 118 may direct, in step 900, the broker 112 to generate and send a coupon associated with the entity's presence identifier 104 in a media-providing domain 100. The coupon is redeemed in association with the entity's presence identifier 106 in the retail domain 102. Thus, the incentivizer 118 has incented the entity to perform a cross-domain transaction that results in gathering the information needed by the broker 114 to bind together these two identifiers 104, 106 of the entity. In this situation, the broker 112 may have monitored the transaction and sent the information to the binder 114. The results may then be received by the incentivizer 118 via a cross-domain identifier 400 created by the binder 114.

In step 904, the incentivizer 118 rewards at least one operator 108, 110 in at least one of the domains 100, 102. (The reward may pass through the broker 112 as appropriate.) The reward is another incentive, in this case an incentive to the operator 108, 110 to cooperate with the broker 112 in providing the incentive that produced the desired behavior in the entity. Different rewards are appropriate to different operators 108, 110 in different domains 100, 102. Rewards can include, for example, money, publicity, increased traffic directed toward the operator's domain, access to information (such as that gathered by the broker 112), increased public safety (when, for example, a domain is a public-safety jurisdiction), increased number of customers, and certification of compliance with a regulation.

In some embodiments, the incentivizer 118 is not yet done with the entity but may, based on the entity's response to the incentive, send a revised rule to the broker 112 in step 906. For example, an entity that often redeems coupons for products promoted by the incentivizer 118 can be rewarded by higher-value coupons or other considerations. Indeed, the incentivizer 118 can even reward the entity directly in step 908 of FIG. 9b by sending a reward associated with the entity's presence identifier 104, 106 in one of the information domains 100, 102. Note that even in this case, the reward may need to pass through the broker 112 because the incentivizer 118 may not have enough information to send the reward directly. In other embodiments, the incentivizer 118 need not send a revised rule because the original rule sent to the broker 112 can be adaptive to cover these cases.

A distinction between the incentivizer 118 and the broker 112 should be drawn. In some cases, the incentivizer 118 is a neutral party, working mainly to help the binder 114 get enough information to do its work. In other cases, however, the incentivizer 118 works for a commercial interest, such as the interested party 116, and pushes coupons and advertisements for that party's commercial interest. These non-neutral incentivizers 118 are able to work without compromising the entity's confidential information because these incentivizers 118 are made to work through the neutral, and trusted, broker 112.

Figure 10:
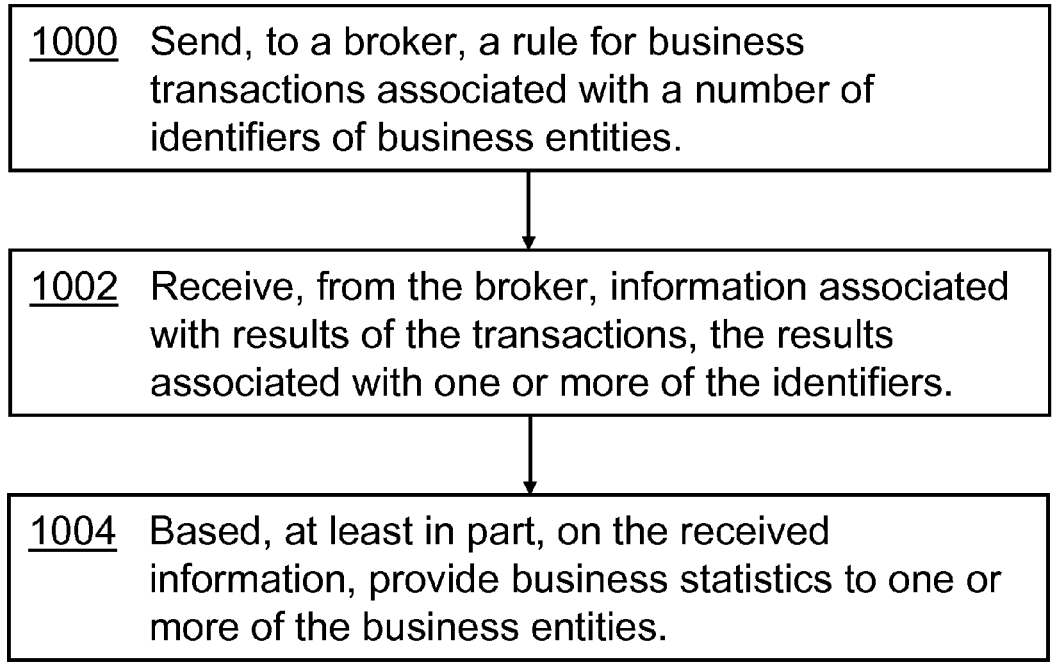
FIG. 10 is a flowchart of an exemplary method for incenting business entities to provide information about their presence in a domain.

FIG. 10 presents another exemplary method usable by the incentivizer 118. In step 1000, the incentivizer 118 sends a rule to the broker 112. In this example, the rule tells the broker 112 how to contact business entities in one or more information domains 100, 102. When contacted, the broker 112 presents an incentive to each business entity. The incentive specifies that if the business entity is willing to release some of the information that this business collects about its own business transactions, then the business entity will be rewarded with a statistical analysis of business transactions in the same area of business in which the business entity operates.

In step 1002, the incentivizer 118 receives the specific business intelligence from those business entities willing to participate. This received intelligence is then statistically analyzed, and the results are sent to participating business entities in step 1004. As with the example concerning human entities given above, the confidentiality of the individual business entities is preserved during this analysis. Thus, in return for surrendering information about its own operations, a business entity receives general information about the marketplace in which it operates. That general information is based on the analysis of the information released by the individual business entities and is therefore probably more accurate and up-to-date than the information provided by other, less direct, business analysis techniques.

The methods of FIGS. 9a, 9b, and 10 are simply examples showing how the incentivizer 118 can induce entities to act in particular ways that will in turn help the entities themselves or help other participants (such as the operators 108, 110, the broker 112, and the binder 114) to perform their tasks more effectively.

Having detailed the operations of the individual elements of the environment of FIG. 1, the discussion now turns to a few examples illustrating how these elements can work together. Much of the discussion that accompanies FIGS. 11 through 15 is redundant with what appears above, but these figures clarify how the elements work together to achieve desired outcomes.

Note that the message flows in FIGS. 11 through 15 are illustrative only and are presented at a high level. Details of message contents and the particulars of message exchanges vary with various embodiments and are readily implemented by one of ordinary skill in the art of data communications. Those engineers implementing the present invention will apply known data-communications techniques. For example, a large portion of the information exchanged in these message-flow diagrams should be encrypted; many messages should also be authenticated.

Figure 11:
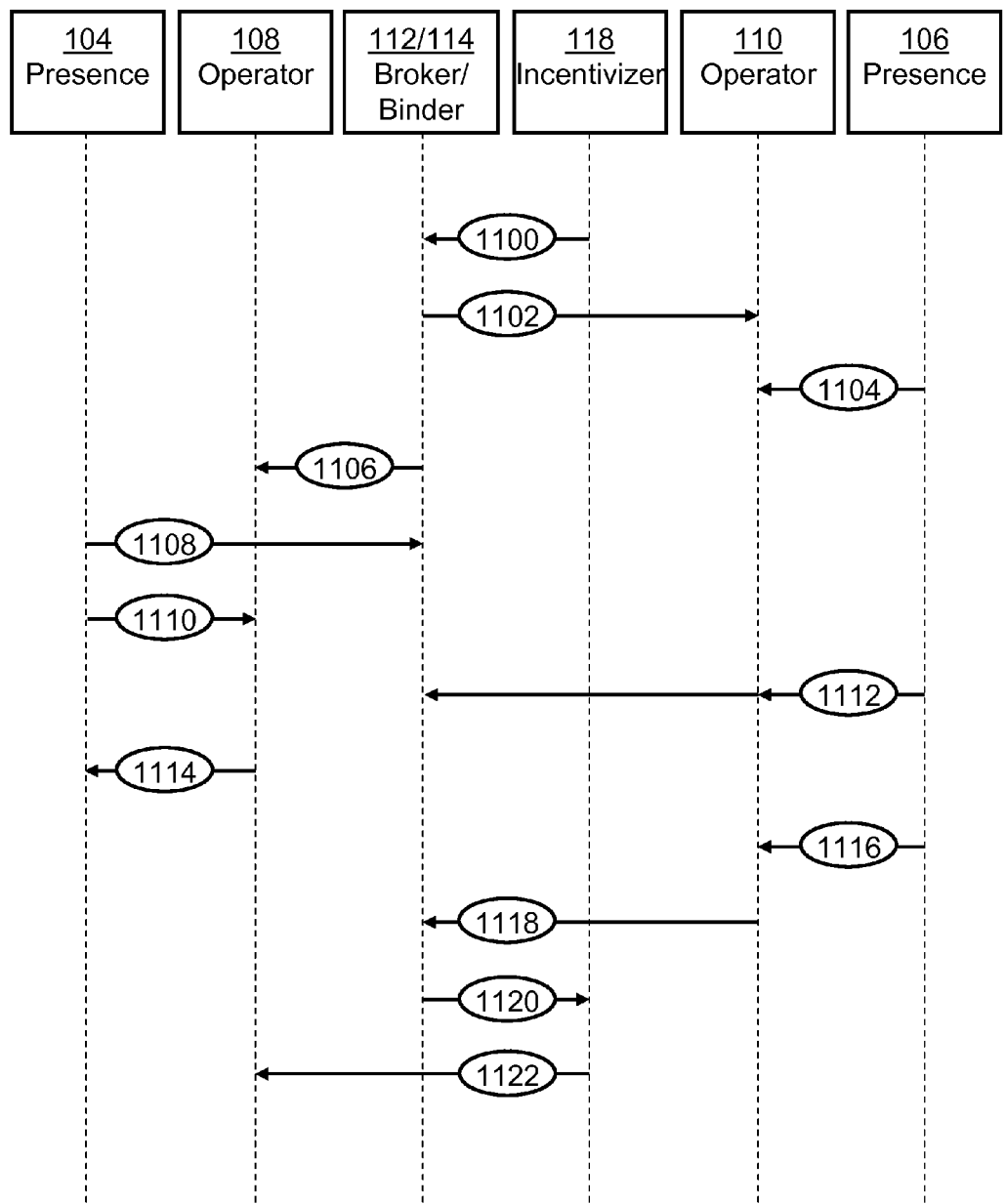
FIG. 11 is a message-flow diagram illustrating a first application of aspects of the present invention.

In FIGS. 11 through 15, time generally flows from the top to the bottom. However, many message flows, though shown at one point in time, are actually ongoing. For example, the message flow 1110 of FIG. 11 (collecting, by an operator 108, observations of behavior in the first domain 100) typically starts before the particular sequence in FIG. 11 begins, continues all during the sequence of FIG. 11, and goes on even after the sequence of FIG. 11 is complete.

The vertical dotted lines in FIGS. 11 through 15 have no significance other than to guide the eye to the originators and consumers of each message flow.

In FIGS. 11 through 15, the broker 112 and the binder 114 are combined. While in some embodiments, these two processes 112, 114 are indeed hosted by the same hardware, they are combined in the Figures merely to reflect the close operations of the broker 112 and the binder 114 and to avoid further clutter.

For ease of explanation, these figures only involve two domains and include only one operator 108, 110 in each domain. (The domain on the left of each Figure is called the "first" domain, and the domain on the right is called the "second" domain.) However, as discussed above, the methods of the present invention can be implemented across any number of domains with multiple operators in each domain. Many of the message flows are shown going to only one operator in one domain: In some situations, these flows are repeated to multiple domains, and to multiple operators in each domain, as appropriate for each given situation.

FIG. 11 shows how a coupon can be generated specifically for use by an entity while preserving the confidentiality of that entity's private information. FIG. 11 begins with message flow 1100 when an incentivizer 118 registers with the broker 112 for services. The incentivizer 118 sends rules to the broker 112 detailing a coupon-generation function that the broker 112 will implement.

Having studied the received rules, the broker 112, in message flow 1102, contracts with an operator 110 in the second domain. In the example of FIG. 11, the first domain (on the left of the Figure) is a media-providing domain, and the second domain is a retail domain, the retailer selling, e.g., soft drinks The incentivizer 118 may be working for the manufacturer of the soft drink.

1104 is an optional message flow. Here, the entity registers its presence identifier 106 (e.g., a loyalty card for use in the retail domain) with the operator 110 of the retail domain. By registering, the entity indicates his willingness to participate in the services offered by the incentivizer 118. (In some embodiments, the entity's willingness to participate can be indicated by his redemption of a coupon in message flow 1116.) In some embodiments, this information is then sent by the operator 110 to the broker 112.

The broker 112 prepares a software package that implements the coupon-derivation rules as specified by the incentivizer 118. In message flow 1106, the broker 112 delivers this coupon-derivation package to the operator 108 of the first domain (the media-providing domain). The package is distributed in this way because the operator 108 can access the entities in the first domain, while the broker 112 may not have any such direct access. In some embodiments, the coupon-derivation function is actually implemented by software (e.g., a cookie or applet) distributed by the operator 108 to the entities in its domain.

In message flow 1108, the entity registers with the coupon-derivation function and receives a pseudonym that uniquely identifies it. The entity also registers the loyalty card it uses in the retail domain. Note that the message flow 1108 may not, in some embodiments, carry the loyalty-card information. (That information may go only to the coupon-derivation function which might run on a device owned by the entity rather than a device run by the operator 108.) Note that in the example of FIG. 11, the broker 112 does not know the entity's pseudonym, because that pseudonym is created by the entity and the coupon-derivation function (distributed by the operator 108) working together. Note that in some embodiments, the message flow 1108 goes directly to the binder 114 without the broker 112 seeing this information.

As mentioned above, the operator 108 collects, in message flow 1110, observations about the behavior of the entity in the first domain. These observations can include what shows the entity watches, what calls he makes (if the media-providing domain supports telephony), and what advertisements he watches. The advertisements for products promoted by the incentivizer 118 are of particular interest. These behavioral observations are associated with the pseudonym and with the loyalty card of the entity as registered above in message flow 1108.

As this is going on, message flow 1112 proceeds. Here, the operator 110 collects observations of the entity's behavior in the retail domain. These observations are associated with the entity's retail loyalty card. Of particular interest are observations of purchases, by the entity, of the products promoted by the incentivizer 118. (In a slightly more complicated scenario, observations of purchases of products directly competing with the products promoted by the incentivizer 118 are also of great interest.) In the particular embodiment of FIG. 11, message flow 1112 continues from the operator 110 in the retail domain to the coupon-derivation function associated with the entity in the media-providing domain. Here, the coupon-derivation function uses the loyalty-card information registered by the entity in message flow 1108 to obtain the observations of the entity's retail behavior (at least those observations relevant to the products promoted by the incentivizer 118).

Now knowing something about the entity's retail habits, the coupon-derivation function, in message flow 1114, creates and sends a coupon to the entity, probably in association with an advertisement presented to the entity in the media-providing domain. The coupon is made specifically to appeal to the entity's interests as revealed by the behavioral observations made in the retail domain. As one example, the entity may be seen to be a loyal consumer of the products promoted by the incentivizer 118, and the coupon can reward that loyalty. As another example, the entity may be seen to prefer products that directly compete with the products promoted by the incentivizer 118, and the coupon is made to entice the entity away from the competitor. The coupon is electronically generated and includes, probably encrypted with a public encryption key of the broker 112, the pseudonym of the entity (generated in message flow 1108). This information is used to track the coupon (and possibly to limit its use to this particular entity and to allow its redemption only in association with the entity's retail loyalty card).

In message flow 1116, the entity presents the coupon when he purchases the product in the retail domain. Electronic coupons are well known in the art: The redemption can involve printing the coupon (with a unique identifier) or presenting the coupon electronically.

As part of its regular business (and in response to the contracting in message flow 1102), the operator 110 of the retail domain sends, in message flow 1118, behavioral observations to the broker 112. The observations include purchases, products scanned but not purchased, and, in particular, coupon redemptions. For security reasons, the coupon-redemption information as sent by the operator 110 may include information that the operator 110 does not know how to decode, such as the pseudonym.

In message flow 1120, the broker 112 analyzes the information received in message flow 1118 and sends transaction statistics to the incentivizer 118. Note that these statistics maintain the confidentiality of the entity, while revealing important marketing information to the incentivizer 118. That is, the incentivizer 118 knows that an entity watched an advertisement for a product, received a coupon for that product, and then redeemed the coupon by purchasing the product. When the incentivizer 118 collects numerous examples of this type of transaction, it can draw conclusions about the effectiveness of the advertisement (or at least of the coupon).

In message flow 1122, the incentivizer 118 rewards at least one operator 108, 110. (As mentioned above, the incentivizer 118 may reward all of the operators 108, 110 that participated in the transaction.) The reward can be monetary or can include better intelligence as to how entities are behaving in the operator's domain.

Figure 12:
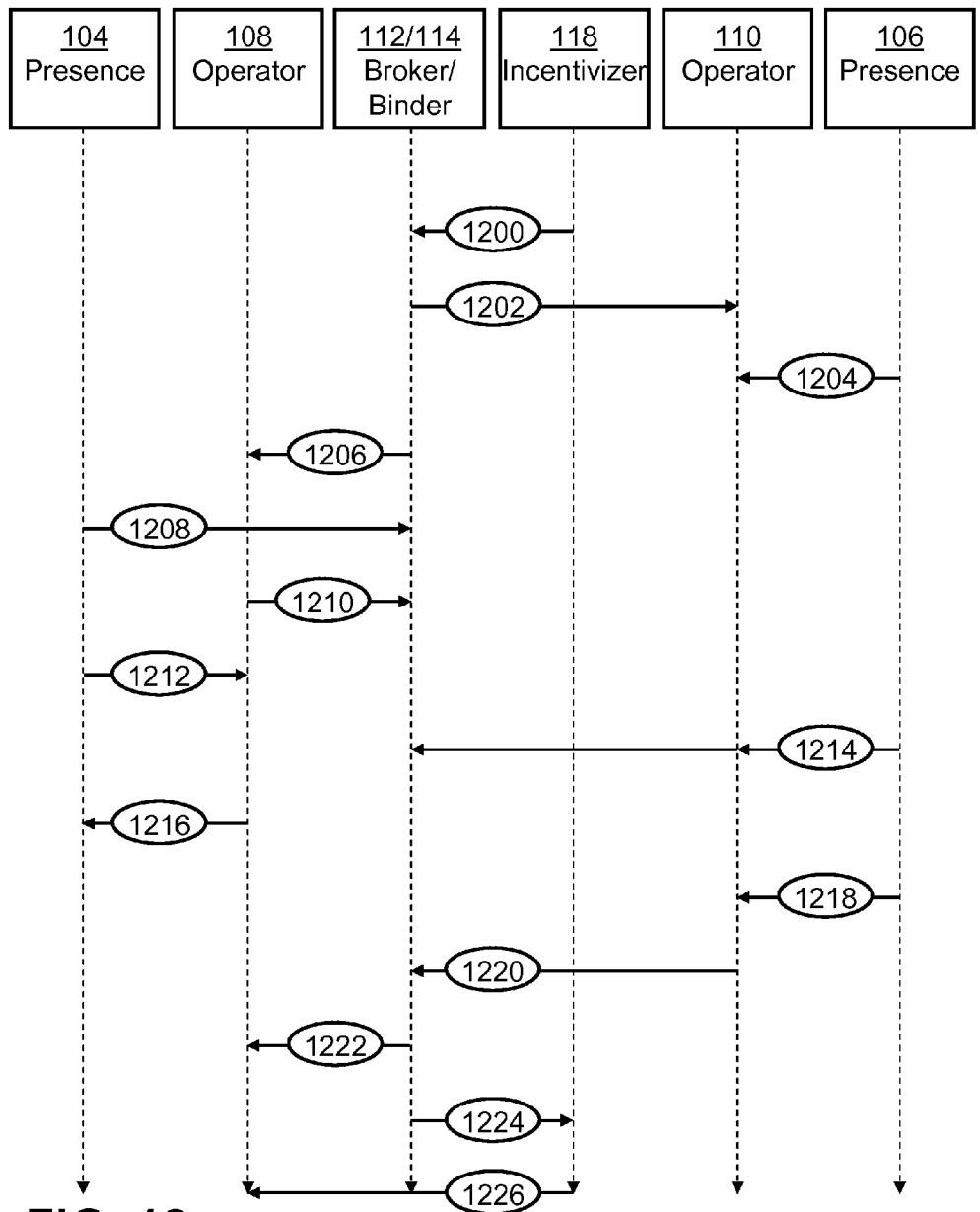
FIG. 12 is a message-flow diagram illustrating a second application of aspects of the present invention.

FIG. 12 presents a scenario slightly different from that of FIG. 11. The first few message flows are similar. The incentivizer 118 registers its coupon-derivation rules with the broker 112 in message flow 1200. The broker 112 contracts with the retail operator 110 in message flow 1202. Then in message flow 1204, the entity optionally registers its interest in the programs offered by the incentivizer 118. The broker 112 delivers the coupon-derivation software to the operator 108 of the media-providing domain in message flow 1206, and the entity registers with the coupon-derivation function in message flow 1208, the entity receiving a unique pseudonym.

The scenario of FIG. 12 diverges from that of FIG. 11 in message flow 1210. Here, the coupon-derivation function registers the entity's pseudonym and a routable identifier with the broker 112.

Message flow 1212 of FIG. 12 is similar to message flow 1110 of FIG. 11: The operator 108 observes the entity's behavior in the media-providing domain. Meanwhile, in the right portion of message flow 1214, the operator 110 observes the entity's behavior in the retail domain. (The left portion of message flow 1214, from the operator 110 to the operator 108, is considered below.)

In message flow 1216, a coupon is created in association with the entity's presence identifier 104 in the media-providing domain. The first time this happens for a given entity the coupon does not include the entity's loyalty card number because the coupon-derivation function does not know it. The coupon does, however, include the pseudonym assigned to the entity in message flow 1208.

The entity redeems the coupon in the retail domain in message flow 1218. Because the entity uses his retail loyalty card for this purchase, when the retail operator 110 sends the transaction statistics to the broker 112 in message flow 1220, this information includes both the pseudonym (from the coupon itself) and the loyalty card number.

With that information, the binder 114 binds together the pseudonym with the retail loyalty card as belonging to the same entity. The broker 112 matches this to the routable identifier (received in message flow 1210) and sends this binding information to the coupon-derivation function in message flow 1222.

This binding information is used to streamline all future interactions between the entity and the coupon-derivation function. Returning to the left portion of message flow 1214, the coupon-derivation function can now use the loyalty card information to receive observations of the entity's retail behavior from the retail operator 110.

The scenario of FIG. 12 ends like that of FIG. 11: The broker 112 sends transaction statistics to the incentivizer 118 in message flow 1224, and the incentivizer 118 in turn rewards at least one of the operators 108, 110 in message flow 1226.

Note that as a result of running through the scenario of FIG. 12, the binder 114 has been able to bind identifiers of the entity across the domains. Note also that the confidentiality of the entity is strongly preserved, as the broker 112 only knows the entity in the media-providing domain in terms of the routable identifier and pseudonym and not in terms of the entity's actual identifier 104.

Figure 13:
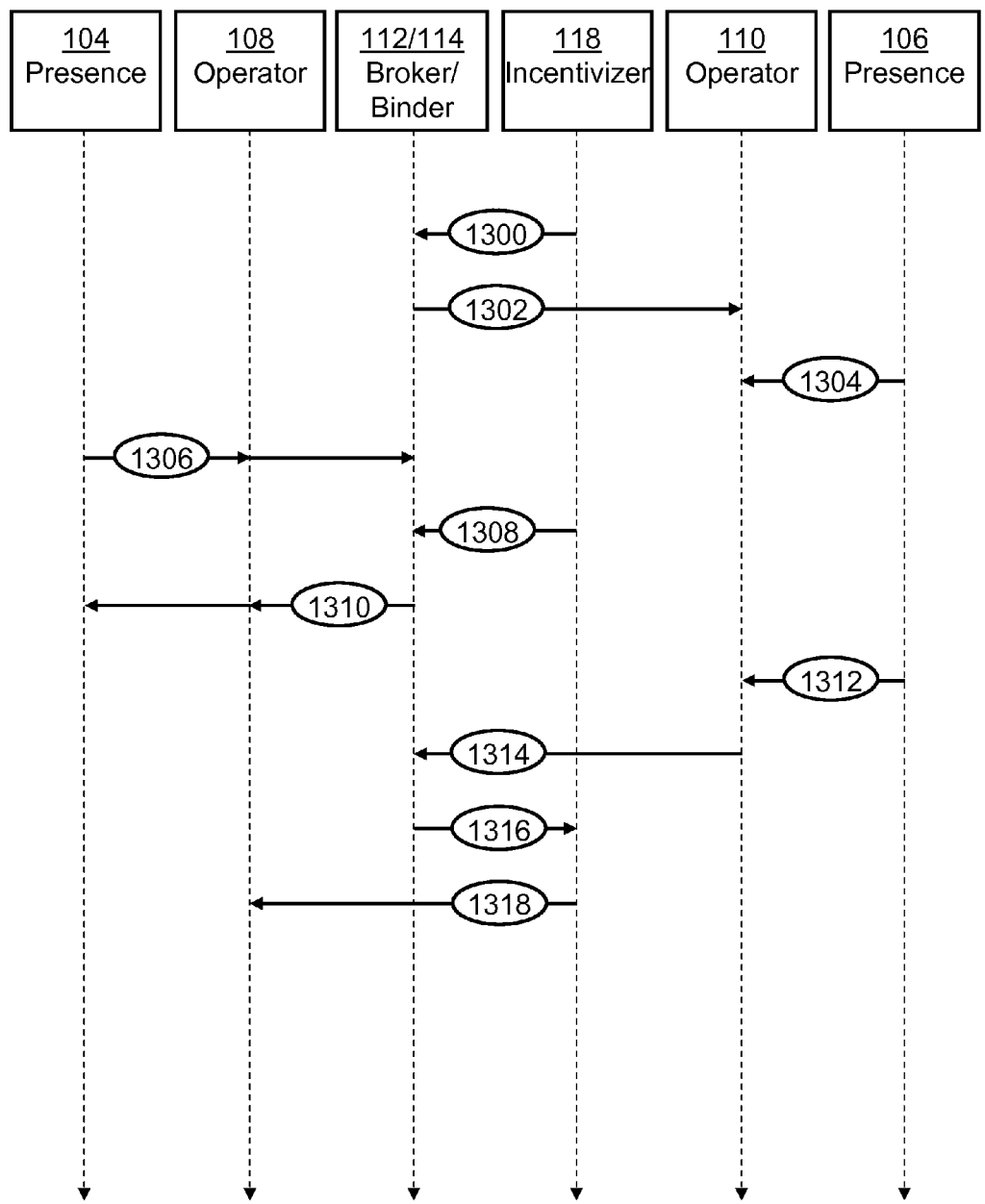
FIG. 13 is a message-flow diagram illustrating a third application of aspects of the present invention.

The opening of the scenario of FIG. 13 is similar to that of the previous two figures: The incentivizer 118 registers with the broker 112 (message flow 1300); the broker 112 contracts with an operator 110 in the retail domain (message flow 1302); and the entity registers his loyalty card to show interest in the offerings of the incentivizer 118 (message flow 1304).

In message flow 1306, observations of the entity's behavior in the media-providing domain are collected by the operator 108 and sent along to the broker 112. The incentivizer 118 sends its coupon rules to the broker 112 in message flow 1308.

In the scenario of FIG. 13, it is the broker 112 itself that generates and sends the coupons, in message flow 1310, through the operator 108. The coupon is keyed to an identifier 104 of the entity in the media-providing domain. (This keying information may be encoded within the electronic coupon itself or may only be stored within the broker 112.)

In message flow 1312, the entity redeems the coupon in the retail domain. Information on this and other transactions is sent to the broker 112 in message flow 1314. Now the binder 114 has enough information to bind together the presence identifiers of the entity: The coupon contains (or is keyed to) the presence identifier 104 in the media-providing domain, and the coupon redemption is associated with the loyalty card number 106 in the retail domain. Thus, the scenario of FIG. 13 is an example of using a stimulus/response transaction across domains to perform the binding.

This scenario ends as did the previous two: The broker 112 sends transaction statistics to the incentivizer 118 in message flow 1316, and the incentivizer 118 rewards at least one operator 108, 110 in message flow 1318.

Figure 14:
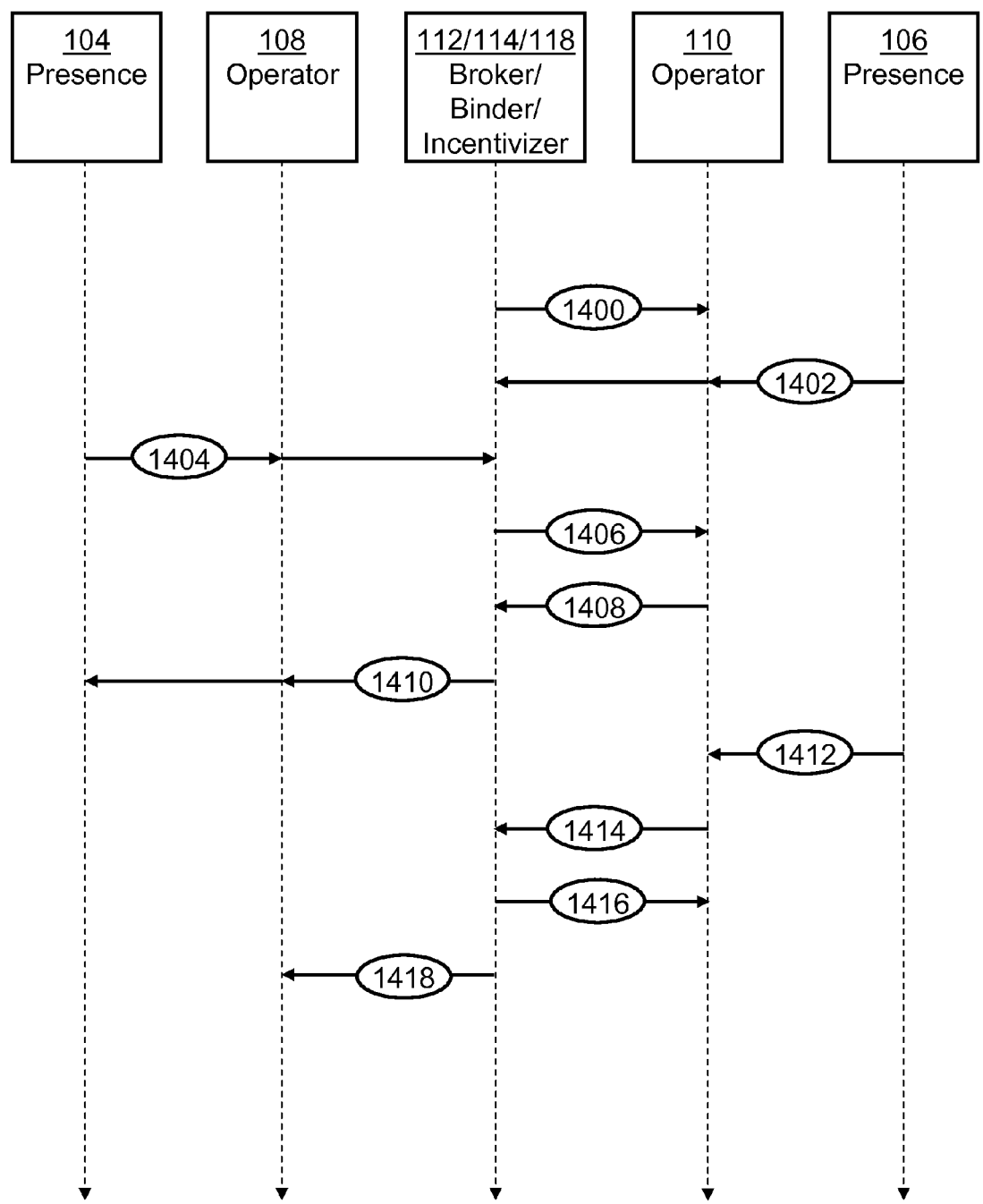
FIG. 14 is a message-flow diagram illustrating a fourth application of aspects of the present invention.

The scenario of FIG. 14 differs significantly from the scenarios of the previous three figures in that the broker 112 is now combined both with the binder 114 and with the incentivizer 118.

The scenario of FIG. 14 involves a "social connector" as described earlier. At the beginning of the scenario, as in the previous scenarios, the broker 112 contracts with the operator 110 of the retail domain in message flow 1400. The entity registers its interest in the programs of the incentivizer 118 in message flow 1402.

The behavior of the entity in the first domain is observed by an operator 108 in that domain, and the observations are sent to the broker 112 in message flow 1404. In this scenario, the first domain can be a communications domain, and the behavioral observations can include call logs and the like. From this (and possibly other) information, the broker 112 determines that the entity is a social connector and that the entity is planning an event (or, at least, that a social event will occur soon, such as a birthday of a member of the entity's social group).

The broker 112 uses this information to decide what types of retailers (or other providers) would be interested in knowing about the upcoming event. The broker 112 may run an auction of this information or may otherwise choose target retailers in message flow 1406. In some situations, the broker 112 can evaluate the "connectedness" of the social connector and estimate the monetary value of the event and set the initial bidding price appropriately.

In message flow 1408, those target retailers that agree to participate send to the broker 112 their rules for coupon and advertisement distribution. The broker 112 implements these rules via the operator 108 in message flow 1410. (Because the social connector is, by definition, able to influence others in his social group, the coupons should be made transferable. In such cases, an electronic chain-of-custody for the coupon can be very useful. When the coupon is finally redeemed, the chain can provide valuable information about the social group. Also, if the coupon is passed on to and redeemed by another person in the social group, future coupons can be sent to that person as well as to the social connector.)

The entity redeems the coupons (or otherwise responds appropriately to the retailers' incentives) in the retail domain in message flow 1412. Message flow 1414 carries the coupon-redemption information to the broker 112. If it has not done so already, the binder 114 uses this redemption information, along with the information already at hand in the broker 112, to bind together the presence identifiers 104, 106 of the entity across the domains.

The broker 112 responds by sending transaction statistics to the participating retailers in message flow 1416, and provides rewards to the participants in message flow 1418.

Figure 15:
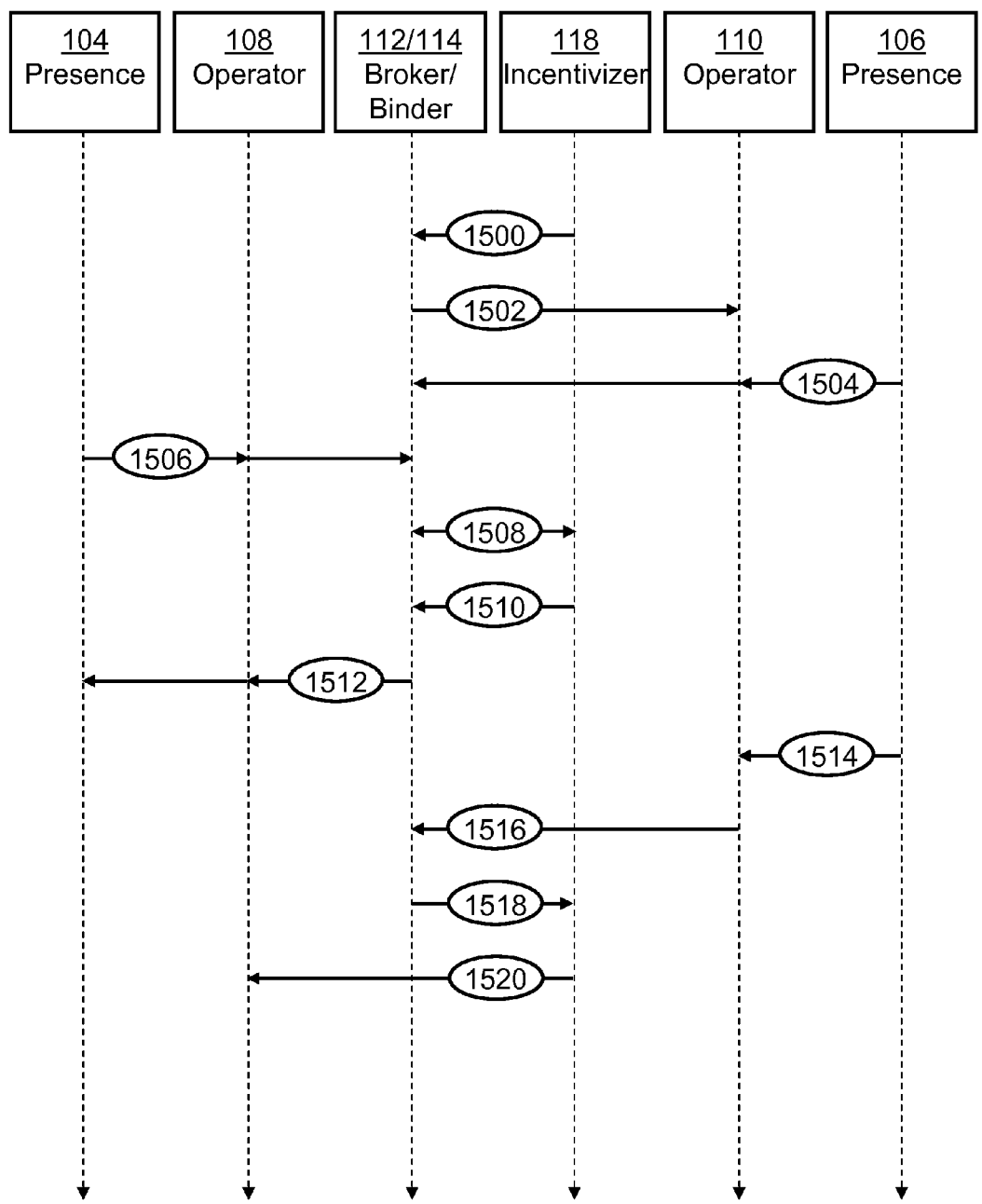
FIG. 15 is a message-flow diagram illustrating a fifth application of aspects of the present invention.

The scenario of FIG. 15 also concerns a social connector, but here the incentivizer 118 is separate from the broker 112. Various incentivizers 118 register with the broker 112 for services in message flow 1500. In consequence, the broker 112 contracts with retail operators 110 in message flow 1502.

The entity can register interest in the offerings of the incentivizers 118 via the message flow 1504, and information about this registration is sent to the broker 112.

In message flow 1506, behavioral observations are made and sent to the broker 112. As in the scenario of FIG. 14, the broker 112 uses this (and possibly other) information to determine that the entity is a social connector and that an event is coming up.

The broker 112 auctions this event information, but, because the incentivizers 118 are distinct from the broker 112, this auctioning occurs among the broker 112 and the various incentivizers 118 (message flow 1508). The winning incentivizers 118 send their coupon-derivation rules to the broker 112 in message flow 1510, and the broker 112 implements these rules to generate and distribute coupons in message flow 1512.

As before, the entity redeems the coupon in the retail domain (message flow 1514), and information on retail transactions, including the redemption, are sent to the broker in message flow 1516. The binder 114 can use this information to bind together the presence identifiers 104, 106 of the entity if it has not already done so. From the retail information, the broker 112 produces relevant transaction statistics and sends them to the participating incentivizers 118 in message flow 1518. The incentivizers 118 reward the participating operators 108, 110 as before in message flow 1520.

Aspects of the present invention, as described above, can be readily adapted to other scenarios. For a first example, an electronic shopping list can be presented to various incentivizers 118 (representing manufacturers) and operators 110 (representing retailers) in an auction. The results of the auction can be used to procure the items on the list as well as to provide information useful for optimizing the supply-chains of the participating manufacturers and retailers. In a second example, an entity's browsing for a product (that is, electronic "window shopping") can be observed and reported to a relevant incentivizer 118. The incentivizer 118 can then send a targeted advertisement for the product to the entity. These two examples are combined when the product-browsing behavior of numerous entities is observed, and, based on those observations, a statistical analysis is produced. The analysis can be sold as market information to manufacturers and retailers.

When the information domains 100, 102 are public-safety domains, the broker 112 may be able to analyze observed behavior and conclude that one person is acting (or has acted) in the two domains 100, 102. Correlating this information can be very valuable to public-safety officials in each domain 100, 102, especially when each domain 100, 102 has not yet produced enough information by itself to guide a response. In this scenario, the observed behavior can include criminal incidents, facial recognition from security cameras (and other biometric information), as well as call records (which can place a person in a particular place at a particular time).

In another scenario, an entity wishes to provide information but wishes to withhold any information that could identify him. For example, the person may be a source for an interesting news story, or may have inside information on a nefarious activity. However, the recipient of the information does not want to act on the tip unless there is some way to authenticate either the tip itself or its source. The source can send his tip to a trusted broker 112, and the broker 112 can correlate this tip with previous tips sent by the same source. (The broker 112 need not know the actual identity of the source but can establish some reliable log-in so that the broker 112 recognizes this source and can correlate the present tip with the source's previous tips.) Then the broker 112 provides the tip to the relevant recipient (newspaper, police) with an estimate of the trustworthiness of the source, all the while maintaining the secrecy of the source's identity. The broker 112 may also package related tips from more than one source and present the package to the recipient, thus shielding the identities of the sources even more. This is an example of the broker 112 making use of the enormous amount of information it receives to provide a valuable service.

In a scenario similar to that of the tipster described just above, the broker 112 can provide past employment information to a potential employer. As a trusted intermediary, the broker 112 can provide honest assessment of the entity's past employment while anonymizing the information. In one case, the potential employer tells the broker 112 the employer's specific hiring needs, and the broker 112 reviews its information to present suitable candidates that do not have bad assessments. The incentive for a previous employer to provide this information to the broker 112 is similar to the case of the businesses sharing individual business records as given above: By sending in information, the participants make the employment database of the broker 112 more complete and accurate which can help the participant in the future when that participant needs to hire someone.

In some situations, the incentivizer 118 may need to incent the entity itself rather than incent an operator 108 in an information domain 100. For example, for a web-based domain 100, behavior observations (e.g., web sites visited) can be made on a PC operated by the entity. Then, the techniques described above can be used, with the incentivizer 118 sending a reward to the entity for allowing observational software to be downloaded to the entity's PC. This observational software can add to the observations made by the cookies typically downloaded by individual web sites.

In view of the many possible embodiments to which the principles of the present invention may be applied, it should be recognized that the embodiments described herein with respect to the drawing figures are meant to be illustrative only and should not be taken as limiting the scope of the invention. For example, aspects of the present invention may be used across other information domains and other operators in those domains. Therefore, the invention as described herein contemplates all such embodiments as may come within the scope of the following claims and equivalents thereof.

We claim:

1. In a multi-domain environment wherein an entity has a first presence identifier in a first domain and a second presence identifier in a second domain, the first domain distinct from the second domain and the first presence identifier of the entity being distinct from the second presence identifier of the entity, a method for an incentivizer server to induce behavior in an operator, the method comprising:
   at the incentivizer server including a processor for running one or more processes hosted by a hardware component for:
   sending, to a broker server distinct from the incentivizer server, a rule for performing a transaction associated with the first presence identifier of the entity in the first domain, wherein the broker server sends the received rule to the entity via a first operator servicing the entity in the first domain, further wherein the incentivizer server provides information to a binder server for binding together the first and the second presence identifiers of the entity in the first and the second domains respectively;
   performing the transaction by the entity in the second domain in accordance with the rule;
   receiving, by the broker server, results of the transaction from a second operator servicing the entity in the second domain;
   receiving, from the broker server, observable behavior information associated with results of the transaction, the results being associated with the second presence identifier of the entity in the second domain; and
   based, at least in part, on the received information, providing a reward to at least one of the first or the second operator.

2. The method of claim 1 wherein the entity is selected from the group consisting of: a human being, a business, a social group, and a government entity.

3. The method of claim 1:
   wherein the first presence identifier is known to the incentivizer server; and
   wherein the second presence identifier is not known to the incentivizer server.

4. The method of claim 1 wherein the incentivizer server represents interests of a business, the business distinct from the entity.

5. The method of claim 1:
   wherein the first domain comprises a media-providing domain selected from the group consisting of: a television service, a music service, a video service, an Internet-based service, a social network, and a telecommunications service; and
   wherein the first presence identifier is associated with an element selected from the group consisting of: a subscription in the media-providing domain, a software token, and a hardware token.

6. The method of claim 1:
   wherein the second domain comprises a retail domain; and
   wherein the second presence identifier identifies a customer in the retail domain.

7. The method of claim 1:
   wherein the transaction comprises a distribution of a coupon; and
   wherein the results of the transaction comprise a redemption of the coupon.

8. The method of claim 1:
   wherein the transaction comprises a distribution of a contest entry; and wherein the results of the transaction comprise a redemption of the contest entry.

9. The method of claim 1:
wherein the incentivizer server represents interests of a government entity, the government entity distinct from the entity;
wherein the first domain comprises a first public-safety domain;
wherein the second domain comprises an element selected from the group consisting of: a second public-safety domain and a private-safety domain; and
wherein the reward comprises increased public safety.

10. The method of claim 1 wherein the incentivizer server represents interests of a social group, the social group distinct from the entity.

11. The method of claim 1:
wherein the first domain comprises a first association selected from the group consisting of: a business, a social group, and a government entity; and
wherein the second domain comprises a second association.

12. The method of claim 1 wherein the received information does not comprise information revealing an identity of the entity.

13. The method of claim 1 wherein the received information is received in association with a cross-domain identifier that logically binds together the first and second presence identifiers of the entity in the first and second domains respectively without identifying the entity, the cross-domain identifier providing access to some information associated with the first presence identifier of the entity in the first domain, the cross-domain identifier providing access to some information associated with the second presence identifier of the entity in the second domain, the cross-domain identifier not providing access to information associated with the first presence identifier of the entity in the first domain or with the second presence identifier of the entity in the second domain pertaining to an identity of the entity.

14. The method of claim 1 wherein the received information comprises statistical information associated with a plurality of transactions.

15. The method of claim 1 wherein the reward is selected from the group consisting of: a monetary value, publicity, increased traffic, access to information, increased public safety, increased number of customers, and compliance with a regulation.

16. The method of claim 1 wherein the reward is provided to at least the first or the second operator through the broker server.

17. In a multi-domain environment wherein an entity has a first presence identifier in a first domain and a second presence identifier in a second domain, the first domain distinct from the second domain and the first presence identifier of the entity being distinct from the second presence identifier of the entity, an incentivizer server comprising:
a communications interface configured for:
sending, to a broker server, a rule for performing a transaction associated with the first presence identifier of the entity in the first domain, wherein the broker server sends the received rule to the entity via a first operator servicing the entity in the first domain, further wherein the incentivizer server provides information to a binder server for binding together the first and the second presence identifiers of the entity in the first and the second domains respectively;
performing the transaction by the entity in the second domain in accordance with the rule;
receiving, by the broker server, results of the transaction from a second operator servicing the entity in the second domain;
receiving, from the broker server, observable behavior information associated with results of the transaction, the results associated with the second presence identifier of the entity in the second domain; and
a processor operatively connected to the communications interface and running an incentivizer server including one or more processes hosted by a hardware component to induce behavior in the second operator, the processor configured for:
receiving, from the communications interface, the observable behavior information associated with results of the transaction; and
based, at least in part, on the received information, providing a reward to at least the first or the second operator.

18. In an environment wherein an entity has a presence identifier in a domain, a method for an incentivizer server to induce behavior in an operator in the domain, the method comprising:
at the incentivizer server including a processor for running one or more processes hosted by a hardware component for:
sending, to a broker server distinct from the incentivizer server, a rule for performing a transaction associated with the presence identifier of the entity in the domain, wherein the broker server sends the received rule to the entity via the operator servicing the entity in the domain, further wherein the incentivizer server provides information to a binder server for binding together a plurality of distinct presence identifiers of the entity in a plurality of distinct domains respectively;
performing the transaction by the entity in the domain in accordance with the rule;
receiving, by the broker server, results of the transaction from the operator;
receiving, from the broker server, observable behavior information associated with results of the transaction, the results associated with the presence identifier of the entity in the domain; and
based, at least in part, on the received information, providing a reward to the operator.

19. The method of claim 18 wherein the incentivizer server represents interests of a business, the business distinct from the entity.

20. The method of claim 18:
wherein the domain comprises a media-providing domain selected from the group consisting of: a television service, a music service, a video service, an Internet-based service, a social network, and a telecommunications service; and
wherein the presence identifier is associated with an element selected from the group consisting of: a subscription in the media-providing domain, a software token, and a hardware token.

21. The method of claim 18:
wherein the results of the transaction comprise media-consumption information;
the method further comprising:
based, at least in part, on the received information, sending, by the incentivizer server to the broker server, a rule for distributing a coupon associated with the presence identifier.

22. The method of claim 18:
  wherein the results of the transaction comprise an agreement by the entity to download media-consumption-tracking software;
  the method further comprising:
    based, at least in part, on the received information, sending, by the incentivizer server to the entity, a reward selected from the group consisting of: a monetary value and access to information.

23. The method of claim 18 wherein the received information comprises statistical information associated with a plurality of transactions.

24. In an environment wherein a plurality of business entities each has a presence identifier in a domain, a method for an incentivizer server to induce behavior in the business entities, the method comprising:
  at the incentivizer server including a processor for running one or more processes hosted by a hardware component for:
  sending, to a broker server distinct from the incentivizer server, a rule for performing business transactions associated with a plurality of the presence identifiers of the business entities in the domain, wherein the broker server sends the received rule to the entity via the operator servicing the entity in the domain, further wherein the incentivizer server provides information to a binder server for binding together a plurality of distinct presence identifiers of the business entities in a plurality of distinct domains respectively;
  performing the business transaction by the entity in the domain in accordance with the rule;
  receiving, by the broker server, results of the business transaction from the operator;
  receiving, from the broker server, observable behavior information associated with results of the business transactions, the results associated with the presence identifiers of the business entities in the domain; and
  based, at least in part, on the received information, providing business statistics to at least a subset of the business entities.

\* \* \* \* \*